United States Patent
Kim et al.

(10) Patent No.: US 11,412,175 B2
(45) Date of Patent: *Aug. 9, 2022

(54) SUPER-RESOLUTION METHOD AND DEVICE USING LINEWISE OPERATION

(71) Applicant: Korea Advanced Institute of Science and Technology, Daejeon (KR)

(72) Inventors: Mun Churl Kim, Daejeon (KR); Yong Woo Kim, Daejeon (KR); Jae Seok Choi, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 41 days.

This patent is subject to a terminal disclaimer.

(21) Appl. No.: 16/961,688

(22) PCT Filed: Dec. 12, 2018

(86) PCT No.: PCT/KR2018/015733
§ 371 (c)(1),
(2) Date: Jul. 12, 2020

(87) PCT Pub. No.: WO2019/143024
PCT Pub. Date: Jul. 25, 2019

(65) Prior Publication Data
US 2021/0366081 A1    Nov. 25, 2021

(30) Foreign Application Priority Data

Jan. 16, 2018  (KR) .................. 10-2018-0005783
Aug. 6, 2018   (KR) .................. 10-2018-0091482

(51) Int. Cl.
*G06K 9/00*   (2022.01)
*H04N 7/01*   (2006.01)
(Continued)

(52) U.S. Cl.
CPC ............. *H04N 7/0117* (2013.01); *G06N 3/08* (2013.01); *G06T 1/20* (2013.01); *G06T 3/4007* (2013.01);
(Continued)

(58) Field of Classification Search
CPC ...... G06K 9/48; G06K 9/4609; G06T 3/4053; G06T 3/4046; G06T 3/4007; G06T 1/20;
(Continued)

(56) References Cited

U.S. PATENT DOCUMENTS 5,838,299 A   11/1998  Smith et al.
6,563,544 B1   5/2003  Vasquez
(Continued)

FOREIGN PATENT DOCUMENTS

KR   10-2006-0077196    7/2006
KR   10-2014-0072097    6/2014
(Continued)

OTHER PUBLICATIONS

International Search Report and the Written Opinion dated Mar. 15, 2019 From the International Searching Authority Re. Application No. PCT/KR2018/015735 and Its Translation of Search Report Into English. (11 Pages).
(Continued)

*Primary Examiner* — Amir Alavi

(57) ABSTRACT

An image processing method and apparatus using a line unit operation is disclosed. The image processing apparatus includes a receiver configured to receive an image, at least one first line buffer configured to output the received image to be an image line of a line unit, a first convolution operator configured to generate a feature map by performing a convolution operation based on the output image line, and a feature map processor configured to store the generated feature map as at least one line unit and process the feature (Continued)

map stored as the line unit to be output in a two-dimensional (2D) or higher dimensional form.

24 Claims, 37 Drawing Sheets

(51) Int. Cl.
*H04N 19/124* (2014.01)
*G06N 3/08* (2006.01)
*G06T 3/40* (2006.01)
*G06T 1/20* (2006.01)
*G06V 10/46* (2022.01)
*G06N 3/04* (2006.01)

(52) U.S. Cl.
CPC .......... *G06T 3/4046* (2013.01); *G06T 3/4053* (2013.01); *G06V 10/462* (2022.01); *H04N 19/124* (2014.11); *G06N 3/04* (2013.01)

(58) Field of Classification Search
CPC ... G06T 7/0075; G06T 7/0022; G06T 7/0083; G06T 5/20; G06T 5/001; G06T 5/004; H04N 7/0117; H04N 19/124; H04N 13/0239; H04N 13/0082; G06N 3/04; G06F 17/156; G06F 17/15
See application file for complete search history.

(56) References Cited

U.S. PATENT DOCUMENTS

| | | | | |
|---|---|---|---|---|
| 10,394,929 | B2* | 8/2019 | Tsai | G06N 3/063 |
| 10,411,709 | B1* | 9/2019 | Ghasemi | G06N 3/0454 |
| 10,521,696 | B2* | 12/2019 | Yang | G06K 9/4619 |
| 10,614,354 | B2* | 4/2020 | Aydonat | G06N 3/0454 |
| 10,664,310 | B2* | 5/2020 | Bokhari | G06F 8/443 |
| 10,726,583 | B2* | 7/2020 | Singh | G06F 13/10 |
| 10,824,939 | B2* | 11/2020 | Fang | G06N 3/063 |
| 10,909,418 | B2* | 2/2021 | Lee | G06K 9/6251 |
| 10,936,907 | B2* | 3/2021 | Suresh | G06N 3/0481 |
| 11,057,585 | B2* | 7/2021 | Kim | G06T 1/20 |
| 2006/0215929 | A1 | 9/2006 | Fresneau et al. | |
| 2013/0083844 | A1 | 4/2013 | Chong et al. | |
| 2020/0336699 | A1 | 10/2020 | Kim et al. | |
| 2021/0065334 | A1 | 3/2021 | Kim et al. | |
| 2021/0082087 | A1* | 3/2021 | Kim | G06N 3/08 |
| 2021/0192315 | A1* | 6/2021 | Son | G06N 3/0454 |

FOREIGN PATENT DOCUMENTS

| | | |
|---|---|---|
| KR | 10-2016-0015799 | 2/2016 |
| KR | 10-1677242 | 11/2016 |
| KR | 10-2017-0059040 | 5/2017 |
| KR | 10-2018-0001428 | 1/2018 |
| WO | WO 2019/143024 | 7/2019 |
| WO | WO 2019/143026 | 7/2019 |
| WO | WO 2019/143027 | 7/2019 |

OTHER PUBLICATIONS

International Search Report and the Written Opinion dated Mar. 15, 2019 From the International Searching Authority Re. Application No. PCT/KR2018/015736 and Its Translation of Search Report Into English. (12 Pages).
Official Action Dated Dec. 24, 2020 from the Re. U.S. Appl. No. 16/960,917. (7 pages).
Prove "An Introduction to Different Types of Convolutions in Deep Learning", Towards Data Science, 8.P., Jul. 22, 2017.
Telarson Pointwise Convolutions and Dimensionality Reduction:, Deep Learning, 2.P., Aug. 2017.
International Search Report and the Written Opinion dated Mar. 18, 2019 From the International Searching Authority Re. Application No. PCT/KR2018/015733 and Its Translation of Search Report Into English. (12 Pages).
Chang et al. "An Energy-Efficient FPGA-Based Deconvolutional Neural Networks Accelerator for Single Image Super-Resolution", IEEE Transactions on Circuits and Systems for Video Technology, 30(1): 281-295, Published Online Dec. 20, 2018.
Chang et al. "ECA: Energy-Efficient FPGA-Based Convolutional Neural Networks Architecture for Single Image Super-Resolution". Computer Science, p. 1-14, Jan. 18, 2018.
Chang et al. "On-Chip CNN Accelerator for Image Super-Resolution", CoRR, 7 P., 2018.
Dong et al. "Accelerating the Super-Resolution Convolutional Neural-Network", Computer Vision and Pattern Recognition, arXiv Preprint arXiv:1608.00367v1, p. 1-17, Aug. 1, 2016.
Dong et al. "Image Super-Resolution Using Deep Convolution Networks", arXiv Preprint arXiv: 1501.00092v3, Jul. 31, 2015.
Kim et al. "2X Super-Resolution Hardware Using Edge-Orientation-Based Linear Mapping for Real-Time 4K UHD 60 Fps Video Applications", IEEE Transactions on Circuits and Systems II: Express Briefs, 65(9): 1274-1278, Published Online Jan. 30, 2018. Abstract.
Kim et al. "A Real-Time Convolutional Neural Network for Super-Resolution on FPGA With Applications to 4 K UHD 60 Fps Video Services", IEEE Transactions on Circuits and Systems for Video Technology, 29(8): 2521-2534, Aug. 8, 2019.
Kim et al. "Accurate Image Super-Resolution Using Very Deep Convolutional Networks", 2016 IEEE Conference on Computer Vision and Pattern Recognition, CVPR '16, Las Vegas, NV, USA, Jun. 27-30, 2016, p. 1646-1653, Jun. 27, 2016.
Shi et al. "Real-Time Single Image and Video Super-Resolution Using an Efficient Sub-Pixel Convolutional Neural Network", The 2016 IEEE Conference on Computer Vision and Pattern Recognition, CVPR '16, Las Vegas, NV, USA, Jun. 27-30, 2016, p. 1874-1883, Jun. 27, 2016.

\* cited by examiner

| Algorithm 1: Feature map compression algorithm of compressor |
|---|
| 1. Input: Feature Map Data in a line. |
| 2. Initialization: |
|     Generate 1×32 block from feature map data in a line |
| 3. For each 1x32 block, do |
| 4.     Compute max value, assign zero min value |
|        $1^{st}$ point = zero value |
|        $32^{th}$ point = max value |
| 5.     Compute 30 intermediate points through interpolation |
|        $2^{nd}$ point = (1/32)*max value |
|        $3^{rd}$ point = (2/32)*max value |
|        ... |
|        $31^{th}$ point = (30/32)*max value |
| 6.     For each feature map in 1x32 block, do |
| 7.         Find index value by closest to reference colors. |
| 8.     End For |
| 9. End For |
| 10. Store each max value and index values of 1x32 block in a line |

SUPER-RESOLUTION METHOD AND DEVICE USING LINEWISE OPERATION

RELATED APPLICATIONS

This application is a National Phase of PCT Patent Application No. PCT/KR2018/015733 having International filing date of Dec. 12, 2018, which claims the benefit of priority of Korean Patent Applications Nos. 10-2018-0005783 filed on Jan. 16, 2018, and 10-2018-0091482 filed on Aug. 6, 2018. The contents of the above applications are all incorporated by reference as if fully set forth herein in their entirety.

FIELD AND BACKGROUND OF THE INVENTION

Example embodiments relate to an image processing method and apparatus using a line unit operation.

Ultra-high-definition (UHD) videos are widely used for UHD television (TV) and Internet protocol TV (IPTV) services, and smartphone applications. Although numerous advanced TVs and smartphones support 4K UHD videos, there are many video streams having a full high-definition (FHD) with a resolution of 1920×1080 due to legacy acquisition devices and services.

Thus, there needs an accurate upscaling method to convert a low-resolution (LR) content to a high-resolution (HR) one. Such an accurate upscaling method may be more needed for video upscaling to convert 2K FHD to 4K UHD.

The upscaling method is classified into two types: One is a single image upscaling algorithm that uses a local spatial correlation in a single LR image to reconstruct lost high-frequency details; The other one is a video upscaling algorithm that uses an additional data dimension or time to improve performance, and costs high for computation.

The single image upscaling algorithm is classified into an interpolation method and a super-resolution (SR) method. The interpolation method uses a simple interpolation kernel such as a bilinear or a bicubic kernel.

The SR method may have improved performance compared to the preceding interpolation method. A fundamental concept of a learning-based approach may be to learn a mapping function from an LR image or video to an HR image or video. The learning-based approach is classified into two types.

One is to learn LR-HR mapping by using surrounding information of an LR image, which is based on internal information of an input image. The other one is to perform learning by using an external LR-HR image pair, which is based on external learning or training image, or based on a dictionary.

For the SR method, a machine learning algorithm such as sparse coding, an anchored neighbor, and a linear mapping kernel have been suggested.

However, such learning-based SR algorithm may need a frame buffer of a great capacity to store intermediate images. Thus, it may not be easy to implement the SR method to convert an HR image to an SR image, for example, a 2K FHD to a 4K UHD, in real time in low-complexity hardware (HW).

A recent suggestion, for example, a deep neural network (DNN), and particularly a convolution neural network (CNN), may exhibit great performance in various computer vision fields such as image classification, object detection, and object segmentation.

The machine learning-based method may discover features in a hand-crafted design and learn mappings using such hand-crafted features. In contrast, the DNN may learn itself optimal features and mappings and make overall learning simpler and more effective.

An accurate CNN-based SR method has been suggested to improve a visual quality of HR reconstruction. Such a CNN architecture may include a plurality of layers and nonlinear functions, and be designed to perform SR and generate HR images or high-quality videos.

It is believed that an existing CNN is difficult to be implemented in a low-complexity HW for a real-time application due to excessive multiplications and calculations. In addition, an analysis of a computational complexity and a runtime of the accurate CNN-based SR method are performed at a level of software (SW) of a platform of a central processing unit (CPU) and/or graphics processing unit (GPU). Further, such a CNN architecture may need to use a plurality of frame buffers to store intermediate feature maps when embodied by SW and HW, and thus it may not be easy to be implemented in real time.

SUMMARY OF THE INVENTION

Example embodiments provide technologies for processing an image using a line unit operation.

According to an example embodiment, there is provided an image processing apparatus including a receiver configured to receive an image, at least one first line buffer configured to output the image to be image lines of a line unit, a first convolution operator configured to generate at least one feature map by performing a convolution operation on the output image lines, and a feature map processor configured to store the at least one generated feature map in at least one line unit and process the at least one feature map stored in the at least one line unit to be output in a two- or higher dimensional (2D) form.

The first convolution operator may be embodied in a residual block to learn residual signals and output the learned residual signals.

The first convolution operator may include at least one one-dimensional (1D) convolution operator configured to perform an 1D convolution operation.

The first convolution operator may include a depth-wise convolution operator, and a point-wise convolution operator connected directly to the depth-wise convolution operator.

The feature map processor may include a compressor configured to compress the at least one feature map into at least one line unit.

The feature map processor may further include at least one second line buffer configured to store the at least one feature map compressed into the at least one line unit.

The feature map processor may further include a decompressor configured to reconstruct, to a 2D feature map, the at least one feature map compressed into the at least one line unit.

The image processing apparatus may further include a second convolution operator configured to perform a convolution operation on the at least one feature map output in the 2D or higher dimensional form.

The second convolution operator may include at least one 2D convolution operator configured to perform a 2D convolution operation.

The second convolution operator may include a depth-wise convolution operator, and a point-wise convolution operator connected directly to the depth-wise convolution operator.

The image processing apparatus may further include a quantizer configured to quantize a result of at least one convolution operation.

The image processing apparatus may further include a weight buffer configured to store at least one parameter value used for a convolution operation.

According to another example embodiment, there is provided an image processing method including receiving an image, outputting the image to be image lines of a line unit through at least one first line buffer, generating at least one feature map by performing a first convolution operation on the output image lines, and storing the at least one feature map into at least one line unit and processing the at least one generated feature map to output the at least one feature map stored in the at least one line unit to be in a 2D or higher dimensional form.

The first convolution operation may be performed in a residual block to learn residual signals and output the learned residual signals.

The generating may include performing at least one 1D convolution operation.

The generating may include performing a depth-wise convolution operation, and performing a point-wise convolution operation directly on a result of the depth-wise convolution operation.

The processing may include compressing the at least one feature map into at least one line unit.

The processing may further include storing the at least one feature map compressed into the at least one line unit.

The processing may further include reconstructing, to a 2D feature map, the at least one feature map compressed into the at least one line unit.

The image processing method may further include performing a second convolution operation on the at least one feature map output in the 2D or higher dimensional form.

The performing may include performing at least one 2D convolution operation.

The performing may include performing a depth-wise convolution operation, and performing a point-wise convolution operation directly on a result of the depth-wise convolution operation.

The image processing method may further include quantizing a result of at least one convolution operation.

The image processing method may further include storing at least one parameter value used for a convolution operation.

BRIEF DESCRIPTION OF THE SEVERAL VIEW OF THE DRAWINGS

FIG. 6b illustrates an example of a compression algorithm of a compressor illustrated in FIG. 5.

DESCRIPTION OF SPECIFIC EMBODIMENT OF THE INVENTION

Figure 1:
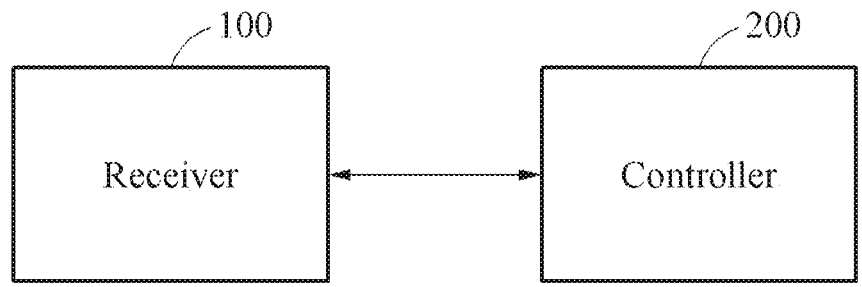
FIG. 1 is a block diagram illustrating an image processing apparatus according to an example embodiment.

Hereinafter, example embodiments will be described in detail with reference to the accompanying drawings. However, various changes, modifications, and equivalents of the methods, apparatuses, and/or systems described herein will be apparent after an understanding of the present disclosure of this application. For example, the sequences of operations described herein are merely examples, and are not limited to those set forth herein, but may be changed as will be apparent after an understanding of the present disclosure, with the exception of operations necessarily occurring in a certain order.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The term "module" described herein may indicate hardware to perform a function and an operation of each component described herein, a computer program code to perform a certain function and operation, or an electronic recording medium, for example, a processor and a microprocessor, in which a computer program code used to perform a certain function and operation is provided.

That is, a module described herein may indicate hardware to perform technical ideas of the present disclosure, and/or a functional and/or structural combination with software to operate the hardware.

FIG. 1 is a block diagram illustrating an image processing apparatus according to an example embodiment.

Referring to FIG. 1, an image processing apparatus 10 may receive an image and process the received image. For example, the image processing apparatus 10 may process the received image to generate a high-resolution (HR) image.

The image processing apparatus 10 may effectively process the received image in low-specification hardware. The image processing apparatus 10 may train a neural network based on the received image.

The image processing apparatus 10 may increase a resolution of the image using the trained neural network. For example, the image processing apparatus 10 may perform super resolution (SR) on a low-resolution (LR) image.

The image processing apparatus 10 may provide a hardware-friendly convolutional neural network (CNN)-based SR method. The image processing apparatus 10 may be embodied in a field programmable gate array (FPGA) to convert a 2K full high-definition (FHD) image to a 4K ultra-high-definition (UHD) one at 60 frames per second (fps).

The image processing apparatus 10 may effectively perform the SR using a neural network in hardware having a limited computation and memory space. The image processing apparatus 10 may process an LR input by each line unit, and maintain a parameter value of a convolution filter at a small number. That is, the image processing apparatus 10 may process LR data by each line unit, and thus significantly reduce the number of filter parameters compared to an existing CNN.

The image processing apparatus 10 may process an SR image using a cascade of a one-dimensional (1D) convolution. The image processing apparatus 10 may thus save a required line memory by maintaining a large receptive field along a horizontal line while maintaining a vertical receptive field at a small size. Herein, a line memory may include a line buffer.

The image processing apparatus 10 may reduce the number of filter parameters of the neural network by combining a residual connection and a depth-wise separable convolution (DSC), and maintain improved SR performance with a reduced quantity of computations or operations.

The image processing apparatus 10 may convert 32-bit floating-point data to fixed-point data without a degradation of a peak signal-to-noise ratio (PSNR), through quantization. In addition, the image processing apparatus 10 may compress a feature map to reduce a line memory needed to store feature map data.

The image processing apparatus 10 includes a receiver 100 and a controller 200.

The receiver 100 may receive an image. The image received by the receiver 100 may indicate an image of an object formed by refraction or reflection of light. The image may include, for example, a video, a picture, a photograph, and the like.

The receiver 100 may receive the image in a form of pixel information. For example, the receiver 100 may receive two-dimensional (2D) pixel information.

The image may include an LR image and an HR image.

The controller 200 may process the received image. The controller 200 may increase a resolution of the received image. The controller 200 may perform the SR on the received image.

The controller 200 may process the image by a line unit. The controller 200 may output the image by a line unit and perform an operation for a line unit to increase a resolution of the image.

Figure 2:
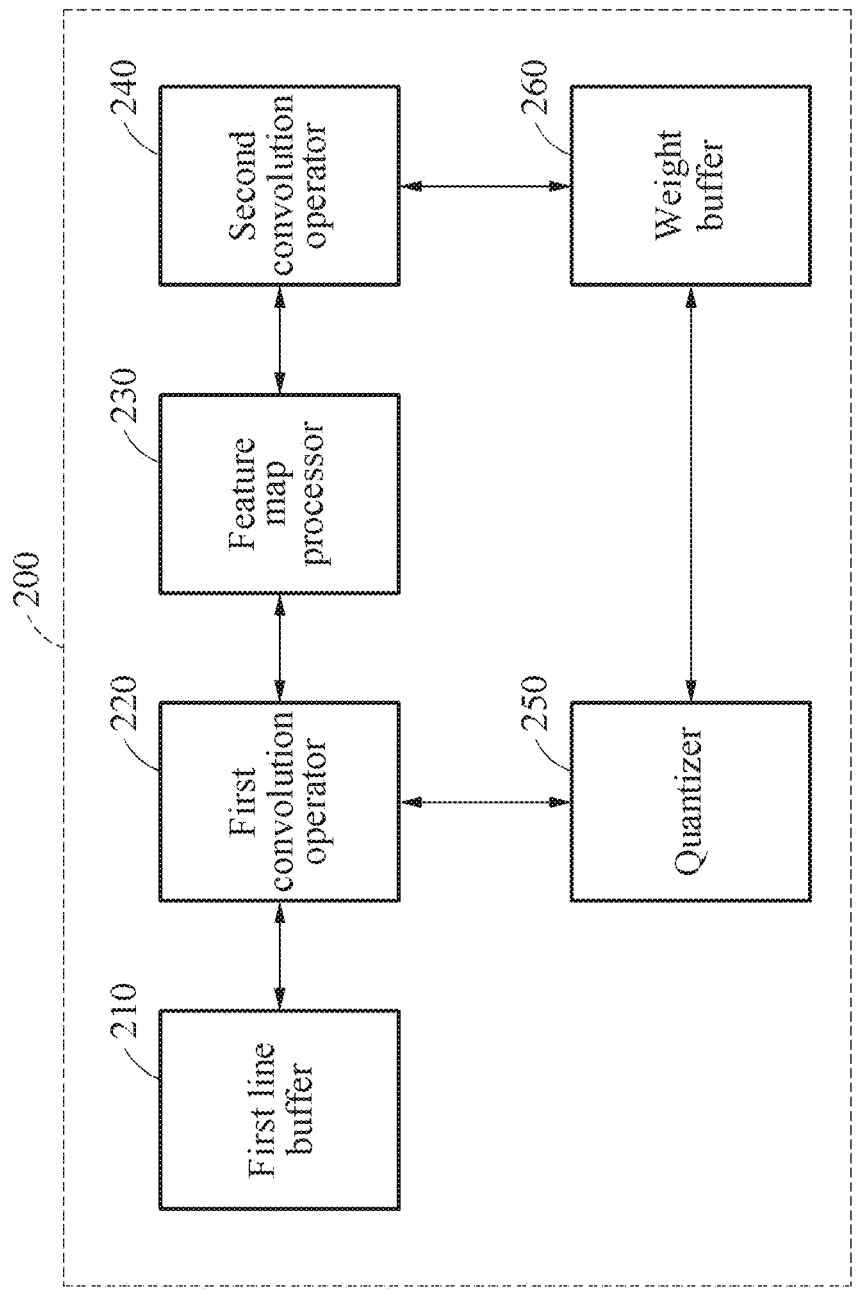
FIG. 2 is a block diagram illustrating a controller illustrated in FIG. 1.

FIG. 2 is a block diagram illustrating a controller illustrated in FIG. 1.

Referring to FIG. 2, the controller 200 includes a first line buffer 210, a first convolution operator 220, and a feature map processor 230. The controller 200 further includes a second convolution operator 240, a quantizer 250, and a weight buffer 260.

The first line buffer 210 may output an image by a line-unit image line. The first line buffer 210 may include at least one line buffer. Here, the number of line buffers may be determined based on a size of a convolution filter.

The first convolution operator 220 may generate a feature map by performing a convolution operation based on the output image line.

The feature map processor 230 may store the generated feature map as at least one line unit, and process the feature map to output the feature map stored as at least one line unit to be in a 2D or higher dimensional form.

The second convolution operator 240 may perform a convolution operation based on the feature map output in the 2D or higher dimensional form.

The quantizer 250 may quantize a result of at least one convolution operation. The quantizer 250 may quantize convolution results and filter parameters using various quantization methods.

The quantization methods of the quantizer 250 may include all quantization algorithms that convert a floating point to a fixed point, for example, a uniform quantization and a non-uniform quantization. For example, the quantizer 250 may quantize the convolution results and the filter parameters through the uniform quantization.

The image processing apparatus 10 may use a fixed-point representation through the quantizer 250 to reduce complexity. The quantizer 250 may convert floating-point data to fixed-point data.

The fixed-point data may be defined as [CL, FL] to indicate respective numerical values, in which IL denotes an integer length and FL denotes a fraction length. The quantizer 250 may calculate a total bit number used to indicate a numeral by adding an integer bit number and a fraction bit number.

A sum of these, IL+FL, may be represented by a WL which denotes a word length. The quantizer 250 may limit a level of data precision to an FL bit through a fixed-point form in [IL, FL], and set a range to be $[-2^{IL-1}, 2^{IL-1}-2^{FL}]$.

When converting a floating point to a fixed point, the quantizer 250 may use a round-off method that rounds off to the nearest. Such round-off method may be represented by Equation 1.

$$\text{Round}(x, [IL, FL]) = \begin{cases} \lfloor x \rfloor & \text{if } \lfloor x \rfloor \leq x \leq \lfloor x \rfloor + \frac{\varepsilon}{2} \\ \lfloor x \rfloor + \varepsilon & \text{if } \lfloor x \rfloor + \frac{\varepsilon}{2} \leq x \leq \lfloor x \rfloor + \varepsilon \end{cases} \quad \text{[Equation 1]}$$

In Equation 1, $\lfloor x \rfloor$ is defined as a greatest integer multiple of $\varepsilon(=2^{-FL})$, which is less than or equal to x. If x is out of a range of [IL, FL], a result may be saturated to a lower or upper limit of [IL, FL]. A method of converting a floating point to a fixed point may also be represented by Equation 2.

$$\text{Convert}(x, [IL, FL]) = \begin{cases} -2^{IL-1}, & \text{if } x \leq -2^{IL-1} \\ 2^{IL-1} - 2^{-FL}, & \text{if } x \geq 2^{IL-1} - 2^{-FL} \\ \text{Round}(x, [IL, FL]), & \text{otherwise.} \end{cases} \quad \text{[Equation 2]}$$

To minimize a PSNR degradation of a test set of floating-point data (filter parameters and activation values) through numerous experiments, optimal WL, IL, and FL values may be applied to the image processing apparatus 10. Here, a degradation by the quantization in a network used by the image processing apparatus 10 may be extremely insignificant.

The weight buffer 260 may store a parameter used for a convolution operation.

The components described above may operate through a pipeline. For example, at least one convolution operation may operate through a pipeline.

Figure 3:
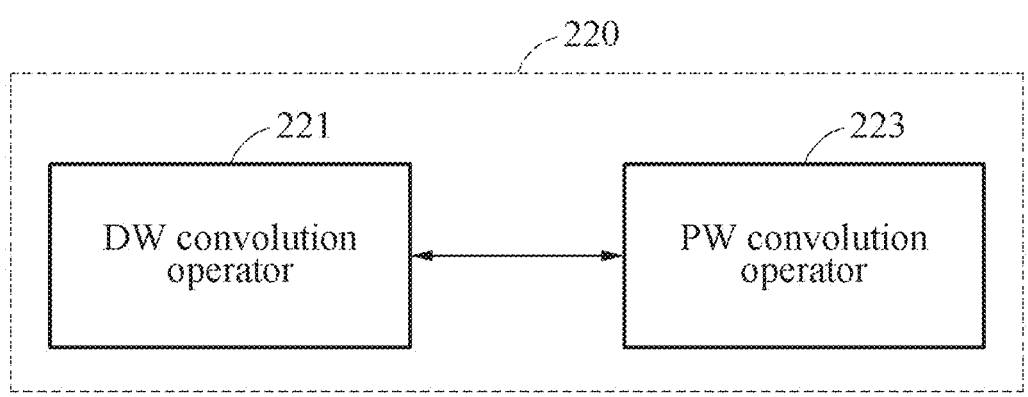
FIG. 3 is a block diagram illustrating a first convolution operator illustrated in FIG. 2.

FIG. 3 is a block diagram illustrating a first convolution operator illustrated in FIG. 2.

Referring to FIG. 3, the first convolution operator 220 may be implemented in a residual block to learn a residual signal and output the learned residual signal. The first convolution operator 220 may include at least one 1D convolution operator configured to perform a 1D convolution operation.

The 1D convolution operation may indicate a convolution operation using line-unit data as an input. For example, the 1D convolution operation may indicate a 1×n convolution. In this example, n, which denotes a length of the line-unit data, may have an arbitrary integer value greater than or equal to 2.

The first convolution operator 220 includes a depth-wise (DW) convolution operator 221, and a point-wise (PW) convolution operator 223 connected directly to the DW convolution operator 221.

The DW convolution operator 221 may perform a convolution operation in a depth direction of a feature map. The DW convolution operator 221 may perform at least one DW convolution operation. The PW convolution operator 223 may perform a convolution operation for each point. The PW convolution operator 223 may perform at least one PW convolution operation.

The DW convolution operator 221 may include at least one 1D convolution operator. The PW convolution operator 223 may perform a 1×1 convolution.

Figure 4A:
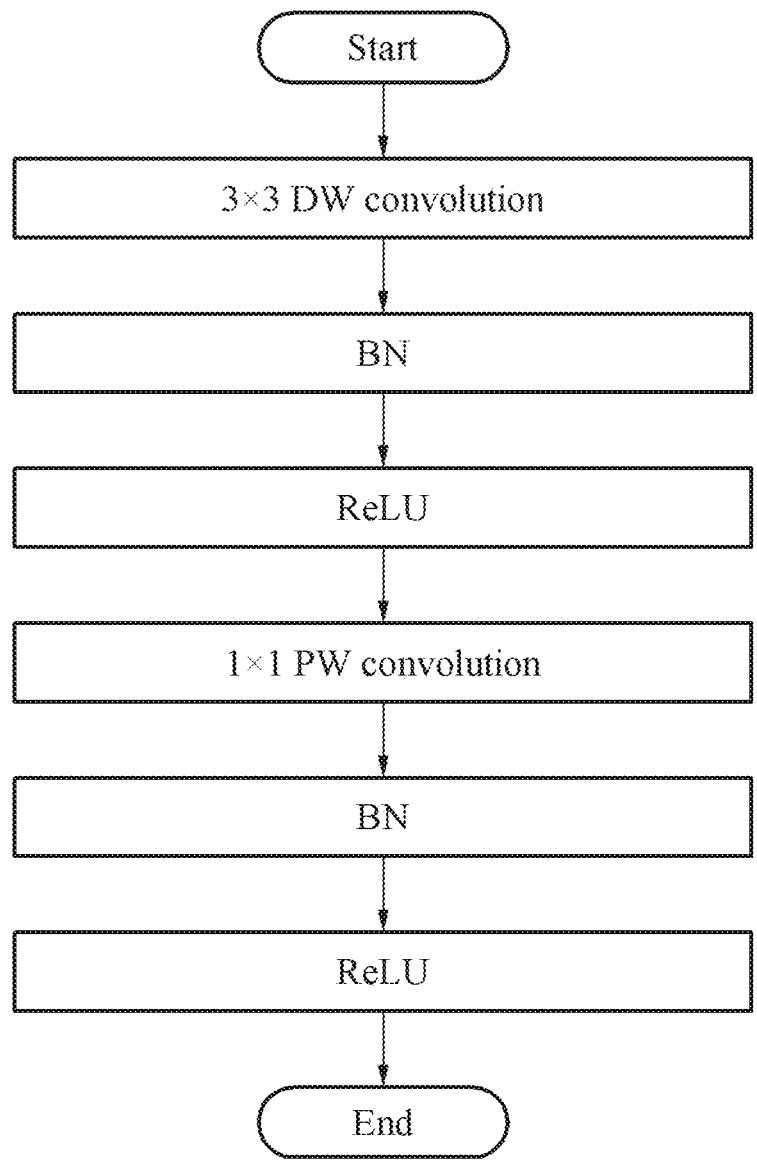
FIG. 4a illustrates an example of an existing depth-wise separable convolution.
Figure 4B:
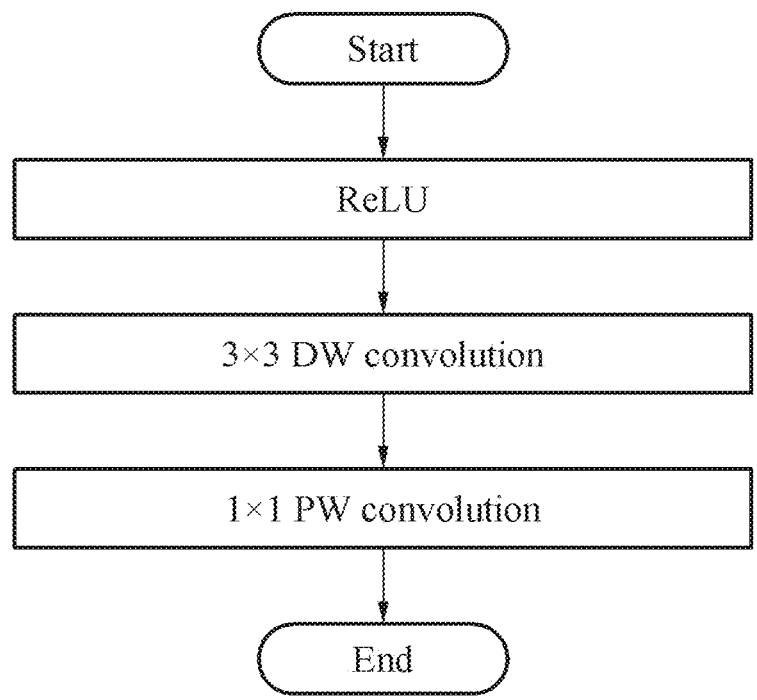
FIG. 4b illustrates an example of an operation of the first convolution operator illustrated in FIG. 2.
Figure 4C:
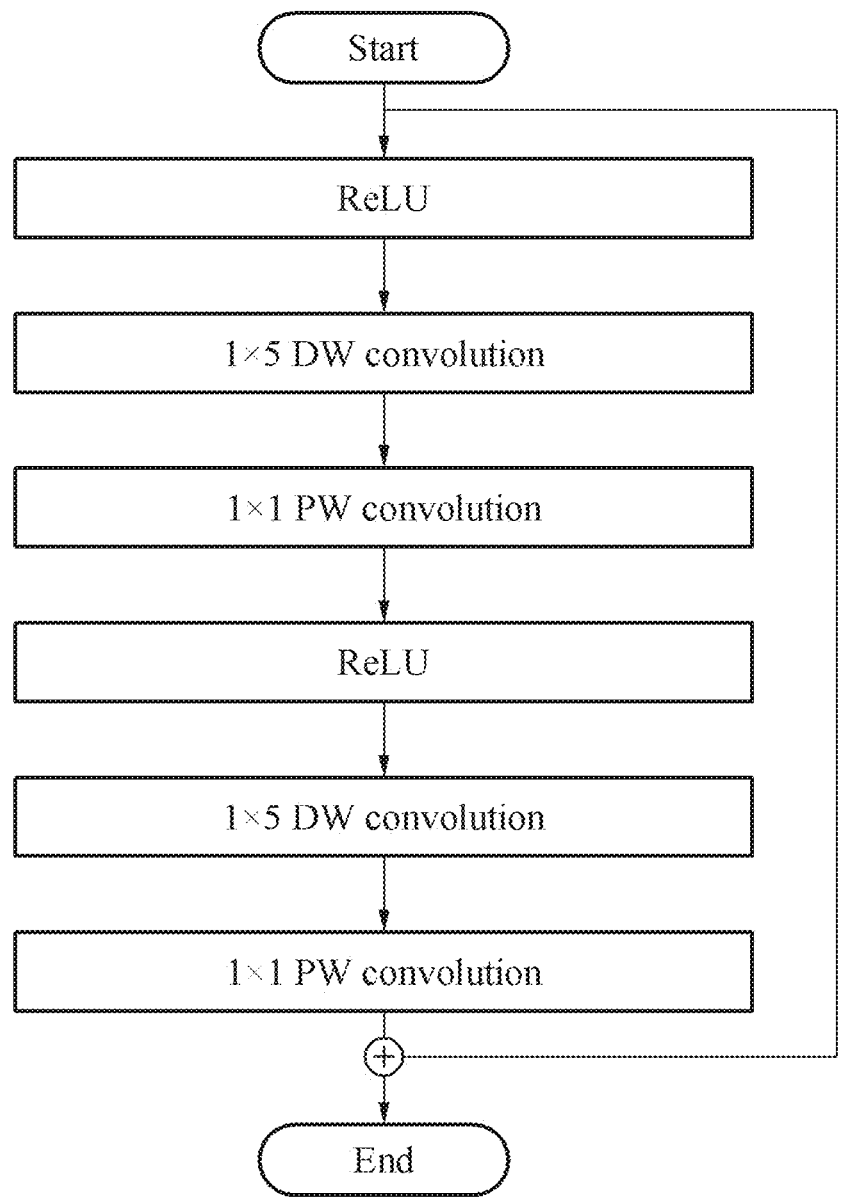
FIG. 4c illustrates another example of an operation of the first convolution operator illustrated in FIG. 2.

FIG. 4a illustrates an example of an existing DSC. FIG. 4b illustrates an example of an operation of the first convolution operator illustrated in FIG. 2. FIG. 4c illustrates another example of an operation of the first convolution operator illustrated in FIG. 2.

Referring to FIGS. 4a through 4c, the first convolution operator 220 may use a DSC to perform a convolution operation. Through this, the first convolution operator 220 may achieve a similar classification performance only with the number of parameters that is approximately ⅛ of that of an existing non-separable convolution.

The DSC may include a DW convolution operation connected in cascade, a rectified linear unit (ReLU), and a PW convolution operation.

However, the DSC may have a relatively low performance when being used in regression as in SR. A batch normalization (BN) may require a relatively high operation or computation quantity to calculate a mean and a variance, while degrading a performance in a regression analysis.

Thus, the first convolution operator 220 may use an architecture in which the BN and the ReLU are removed from the DSC. For example, the first convolution operator 220 may remove the ReLU between the DW convolution operator 221 and the PW convolution operator 223, and use them through a direct connection therebetween.

When a lower number of convolution filters is used along with the ReLU in the DSC, feature maps passing through the ReLU may become extremely sparse. This may obstruct learning and result in a lower PSNR performance.

FIG. 4a illustrates an existing DSC architecture, and FIG. 4b illustrates an architecture of a convolution layer used by the first convolution operator 220. A result of comparing PSNR and structural similarity (SSIM) performances for a dataset, Set-5, when there is the ReLU between the DW convolution operator 221 and the PW convolution operator 223 and when there is not the ReLU between the DW convolution operator 221 and the PW convolution operator 223 is as illustrated in Table 1 below.

TABLE 1

|  | Mean PSNR | Mean SSIM |
| --- | --- | --- |
| ReLU present | 33.54 dB | 0.9544 |
| ReLU absent | 33.66 dB | 0.9548 |
| Difference | +0.12 dB | +0.0004 |

In the existing DSC, a 3×3 size filter may be used for a DW convolution. However, some display applications such as T-Con may not excessively use a line memory, and thus there may be a restriction on using such a 3×3 size filter in a network. However, to obtain a high performance in deep learning, a large receptive filter using a 3×3 or greater filter may be needed.

Thus, the image processing apparatus 10 may use a 1D horizontal convolution for some convolution layers such that a network is more compact and suitable for hardware to which LR input data is to be streamed for each line. For example, the image processing apparatus 10 may apply a 1D horizontal convolution to the first convolution operator 220.

Thus, the first convolution operator 220 may have a rectangular receptive field having a longer length in a horizontal direction and a shorter length in a vertical direction. Thus, the image processing apparatus 10 may reduce a line memory required to store intermediate feature maps to be as small as possible.

For effective hardware implementation, a network may need to maintain a convolution filter to be practically small. However, when filter parameters are less, learning or training of a network including the DSC and the 1D horizontal convolution may be degraded.

This is because an interlayer connection in the network may be sparse due to the shortage of filter parameters, and thus learning of image reconstruction or restoration may not be performed properly.

The image processing apparatus 10 may considerably reduce the number of filters while exhibiting a desirable SR performance by inserting a residual connection in a network. For example, the image processing apparatus 10 may reduce the number of filters by implementing the first convolution operator 220 in a residual block.

In terms of hardware, additional line memories may be needed to store an input of the residual connection in order to embody the residual connection by a 2D convolution, and be needed at ends of the connection.

Thus, the image processing apparatus 10 may be readily implemented in hardware by using a delay buffer using only a 1D convolution in the residual connection. FIG. 4c illustrates a final DSC architecture having a final 1D horizontal convolution and a residual connection.

Figure 5:
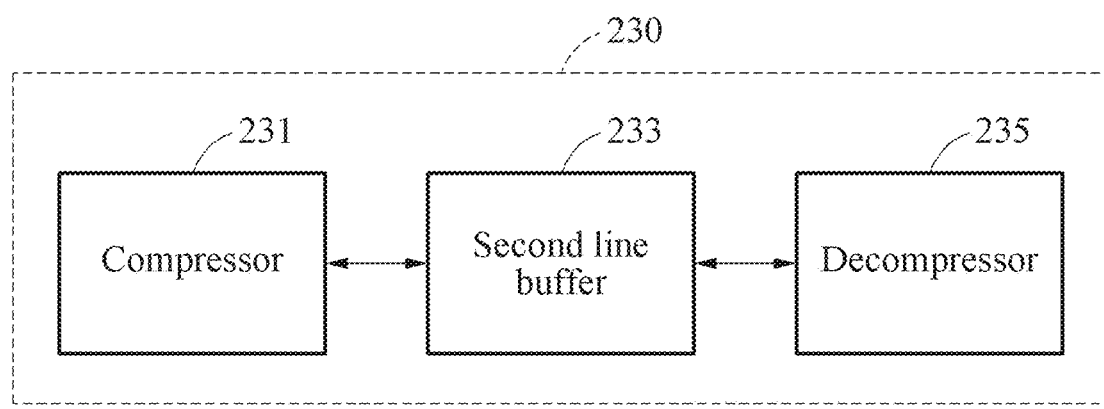
FIG. 5 is a block diagram illustrating a feature map processor illustrated in FIG. 2.

FIG. 5 is a block diagram illustrating a feature map processor illustrated in FIG. 2.

Referring to FIG. 5, the feature map processor 230 includes a compressor 231, a second line buffer 233, and a decompressor 235.

The compressor 231 may compress at least one feature map into at least one line unit. The compressor 231 may compress the at least one feature map in at least one direction of a width direction, a height direction, and a depth direction.

The second line buffer 233 may store the at least one feature map compressed into the at least one line unit. The second line buffer 233 may include at least one line buffer. Here, the number of line buffers to be included may be determined based on a size of a convolution filter used to perform a convolution operation.

The decompressor 235 may reconstruct, to a 2D feature map, the at least one feature map compressed into the at least one line unit.

Figure 6A:
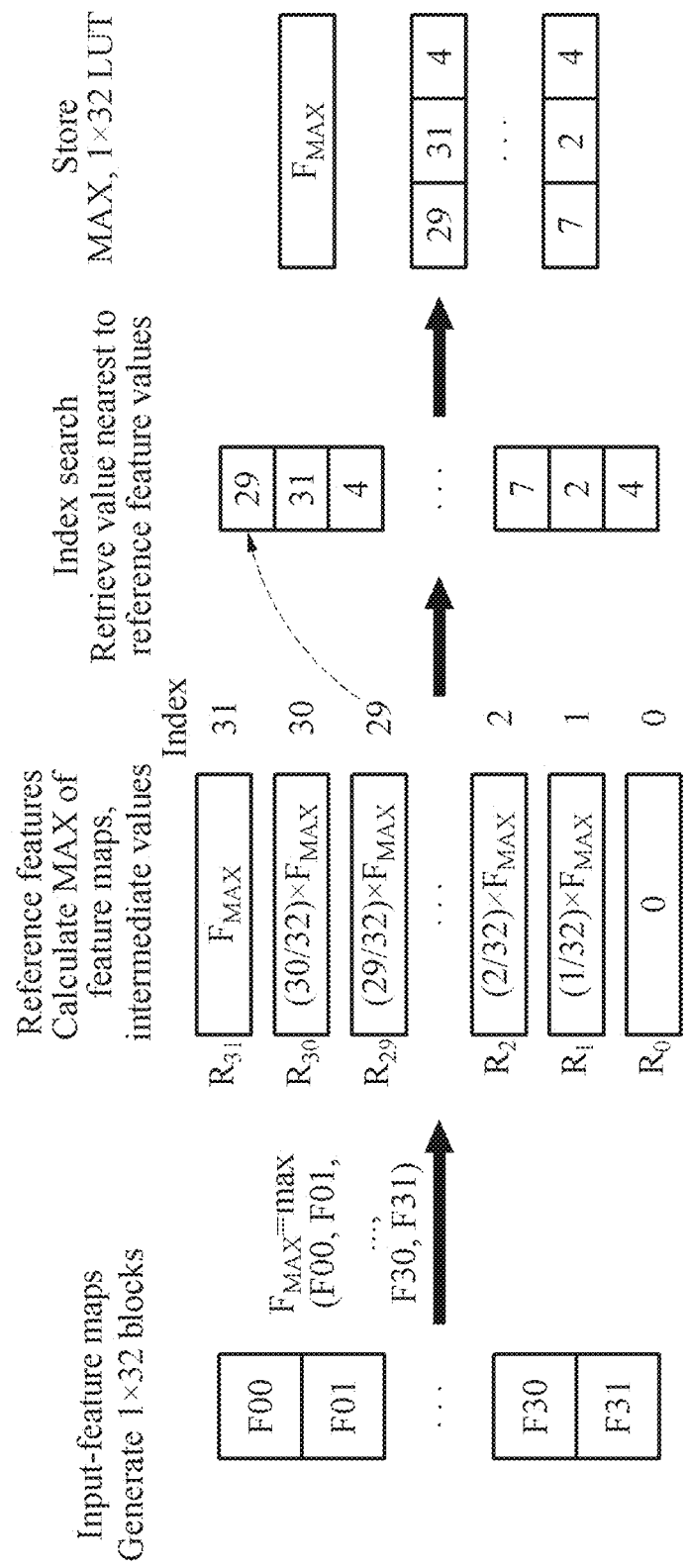
FIG. 6a illustrates an example of an operation of the feature map processor illustrated in FIG. 2.

FIG. 6a illustrates an example of an operation of a feature map processor illustrated in FIG. 2. FIG. 6b illustrates an example of a compression algorithm of a compressor illustrated in FIG. 5.

Referring to FIGS. 6a and 6b, the compressor 231 may compress at least one feature map through at least one compression algorithm. The compression algorithms may include fixed-length coding and variable-length coding. The fixed-length coding may include a S3 Texture Compression (S3TC) (sometimes also called DXT) algorithm, and a block-based algorithm such as joint photographic experts group (JPEG) and JPEG 2000. The fixed-length coding may be preferred in terms of hardware complexity.

The variable-length coding may include a Huffman coding and an arithmetic coding. The variable-length coding may be used to increase a compressibility.

In addition, the compressor 231 may compress at least one feature map using an algorithm modified from the algorithms described in the foregoing.

A size of a receptive field may greatly affect performance. In addition, both a horizontal receptive field and a vertical receptive field may be important. However, in a case of a 3×3 convolution including a vertical direction, the at least one feature map data may need to be stored in a line memory when data output after passing through a previous convolution layer is transmitted to a subsequent 3×3 convolution layer.

When passing through a 3×3 convolution layer, line memories that are twice as many as the number of line memories required to store output feature maps of a current layer may be needed.

However, using many line memories may result in issues in chip design. For example, the issues may include an increase in chip size due to an increase in the number of power rings used in the line memories, a routing congestion in place and route (P&R), and a voltage drop in case of a shortage of power rings in a memory block boundary.

To solve such issues, there may need a method of reducing the number of line memories, and a feature map compression method may be considered as one of methods to reduce the number of line memories.

The compressor 231 may use the feature map compression method based on various considerations in terms of hardware implementation. A feature map to be compressed by the compressor 231 may include an intermediate feature map.

The compressor 231 may use an extremely simple compression algorithm. Herein, compression may be used to reduce the number of line memories. Thus, a size of a logic used for the compression may need to be smaller than a size of a memory required to store an intermediate feature map before the compression.

Residual learning and use of a ReLU may cause many 0s and values near to 0 in feature maps, and thus the compressor 231 may provide an effective compression algorithm based on such data characteristic. The compressor 231 may compress data, using only nearby data in a horizontal direction to effectively use a line memory.

For example, an algorithm used by the compressor 231 may include an algorithm modified from a DXT5 algorithm to be suitable for a CNN architecture. For example, when compressing a red, green, and blue (RGB) pixel of a 4×4 block, DXT5 may compress respective RGB color channel inputs, independently.

In this example, a maximum value (MAX) and a minimum value (MIN) of each color channel may be calculated. Thus, six intermediate points may be generated through interpolation using calculated maximum values and minimum values. The maximum values and the minimum values, and the six intermediate points may be defined as a reference value for the compression.

To encode pixel data, an index value of a color nearest to a reference color may be assigned to each pixel. The encoding may be completed by storing a 4×4 block index value, and the maximum value and the minimum value. There may be eight neighboring index values for each pixel in a 4×4 block, and each index may be represented by 3 bits for each pixel.

In addition, decoding may be readily performed using the maximum value and the minimum value, and the index value, in reverse order from that of the encoding. For example, when a bit per pixel (bpp) of an RGB input is 8 bits, DXT5 may have a set compression ratio (CR) for the 4×4 block.

The CR may be calculated as represented by Equation 3.

$$CR = \frac{\text{uncompressed bits}}{\text{compressed bits}} \qquad \text{[Equation 3]}$$
$$= \frac{bpp \times \text{block\_size}}{3 \times (\text{max} + \text{min} + \text{block\_size} \times \text{index})}$$

The compressor 231 of the image processing apparatus 10 may minimize an image quality degradation by modifying the DXT5 algorithm. Differences between the existing DXT5 and the image processing apparatus 10 may be as indicated in Table 2.

TABLE 2

| Method | Existing DXT5 | Image processing apparatus 10 |
| --- | --- | --- |
| Input | RGB | Intermediate feature maps |
| Bits | 24 bits | 14 bits (quantized) |
| Block | 4 × 4 | 1 × 32 |
| Max value | Compute | Compute |
| Min value | Compute | 0 (fixed) |
| Bits per index | 3 | 5 |

TABLE 2-continued

| Method | Existing DXT5 | Image processing apparatus 10 |
| --- | --- | --- |
| Divisor value | 7 | 32 (approximate) |
| Compression ratio | 2:1 | 2.58:1 |

The compressor 231 may calculate only the maximum value with the minimum value being set as 0. By setting the minimum value as 0, the compressor 231 may use a characteristic of data of intermediate feature maps being 0 or a value near to 0.

By setting the minimum value as 0, the image processing apparatus 10 may reduce bits to store the minimum value, and remove a logic to calculate the minimum value. Since the data of the intermediate feature maps needs to be processed by a line unit in hardware, a block size of the data of the feature maps may be set to be 1×32.

In addition, a 5-bit index may be assigned, as a quantization level, to each set of data in the 1×32 block of the feature maps. A single index of the data may be assigned to maintain an image quality. A 5-bit length for indices may be experimentally determined by verifying a PSNR performance based on a bit length for data point indices.

A CR of the compressor 231 may be represented by Equation 4.

$$PCR = \frac{\text{bits of quantized feature map} \times \text{block\_size}}{\text{bits of max} + \text{block\_size} \times \text{bits of index})} \qquad \text{[Equation 4]}$$

For example, when a word length (WL) of feature map data after quantization of an activation is a 14-bit depth, the CR may be 2.58:1(=14(1×32)(14+5(1×32))). That is, the number of line memories to store feature maps may be reduced to approximately 2.58 times.

As indicated in Table 2, the compressor 231 may set a divisor value to be 32, which is a multiple of 2, in lieu of $31(2^1-1)$, to reduce hardware complexity in calculating intermediate points. Thus, the compressor 231 may calculate intermediate points by shift and add operators.

Figure 7:
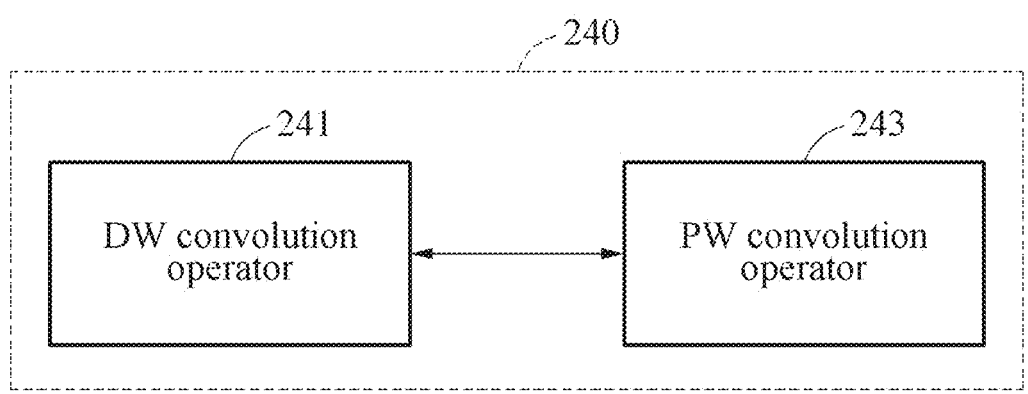
FIG. 7 is a block diagram illustrating a second convolution operator illustrated in FIG. 2.

FIG. 7 is a block diagram illustrating a second convolution operator illustrated in FIG. 2.

Referring to FIG. 7, the second convolution operator 240 includes a DW convolution operator 241, and a PW convolution operator 243 connected directly to the DW convolution operator 241. The second convolution operator 240 may include at least one 2D convolution operator configured to perform a 2D convolution operation.

The DW convolution operator 241 may perform a convolution operation in a depth direction of a feature map. The DW convolution operator 241 may perform a DW convolution operation one or more times. The PW convolution operator 243 may perform a convolution operation for each point. The PW convolution operator 243 may perform a PW convolution operation one or more times.

The 2D convolution operation may indicate a convolution operation using 2D data as an input. For example, the 2D convolution operation may indicate an m×n convolution. In this example, m and n, which denote a length of line unit data, may have an arbitrary integer value greater than or equal to 2.

Although a 3×3 convolution is provided herein as an example of the 2D convolution, the 2D convolution used by the image processing apparatus 10 is not limited to such example convolution.

The DW convolution operator 241 may perform a convolution operation in a depth direction of a feature map, whereas the PW convolution operator 243 may perform a convolution operation for each point.

The DW convolution operator 241 may include at least one 2D convolution operator. The PW convolution operator 243 may perform a 1×1 convolution.

Similar to the first convolution operator 220, the second convolution operator 240 may also perform a convolution operation using a DSC. For a detailed description of the DSC, reference may be made to the description of the DSC provided above with respect to the first convolution operator 220.

Figure 8:
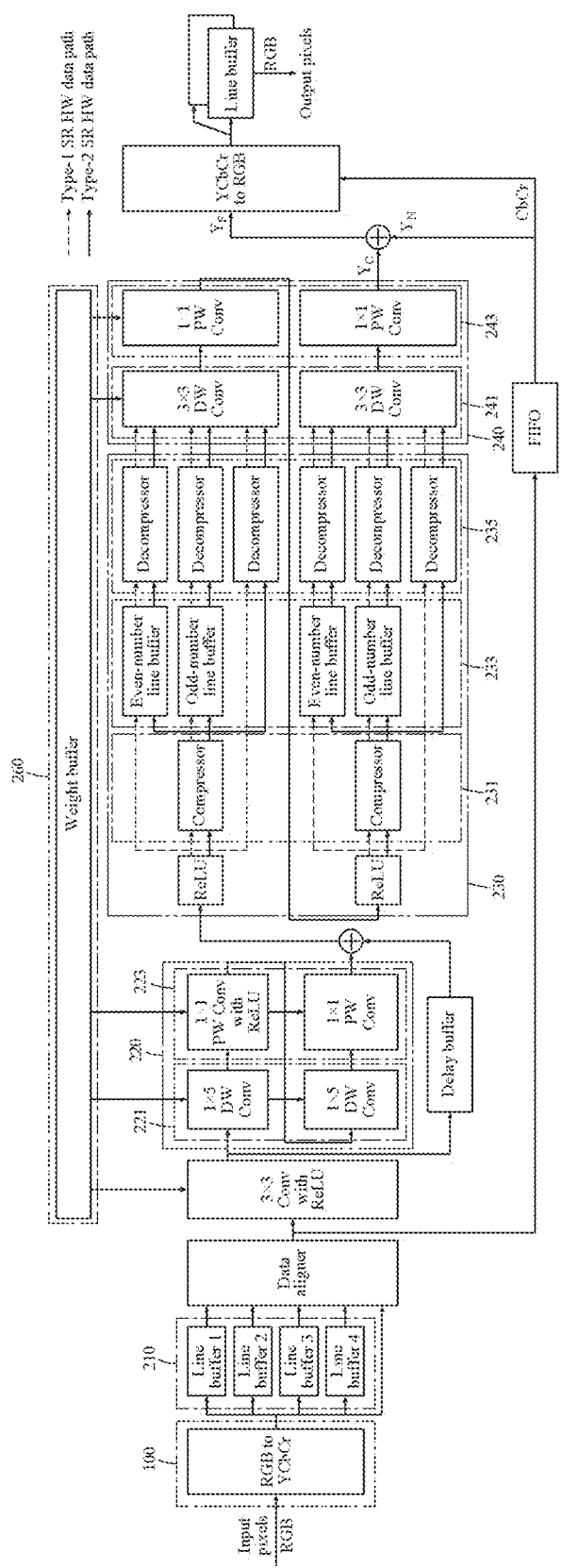
FIG. 8 illustrates an example of a hardware architecture of the image processing apparatus illustrated in FIG. 1.

FIG. 8 illustrates an example of a hardware architecture of an image processing apparatus illustrated in FIG. 1.

The image processing apparatus 10 may process an LR image to generate an HR image. For example, the image processing apparatus 10 may generate a 4K UHD image from an FHD image.

FIG. 8 illustrates a pipeline hardware architecture for SR, which is designed by two types—Type 1 without compression of intermediate feature maps, and Type 2 with the compression.

Details of the example illustrated in FIG. 8 are as indicated in Table 3.

TABLE 3

| Type/Stride/Padding | Filter Shape | Input/Output Size | Remarks |
| --- | --- | --- | --- |
|  |  | 1920 × 1080 × 1 | Input Y |
| Conv/(1, 1)/(1, 1) | 3 × 3 × 1 × 32 | 1920 × 1080 × 32 |  |
| ReLU | — | 1920 × 1080 × 32 |  |
| DW Conv/(1, 1)/(0, 2) | 1 × 5 × 32 dw | 1920 × 1080 × 32 | Residual Block |
| PW Conv/(1, 1)/(0, 0) | 1 × 1 × 32 × 16 | 1920 × 1080 × 16 |  |
| ReLU | — | 1920 × 1080 × 16 |  |
| DW Conv/(1, 1)/(0, 2) | 1 × 5 × 16 dw | 1920 × 1080 × 16 |  |
| PW Conv/(1, 1)/(0, 0) | 1 × 1 × 16 × 32 | 1920 × 1080 × 32 |  |
| ReLU | — | 1920 × 1080 × 32 |  |
| DW Conv/(1, 1)/(1, 1) | 3 × 3 × 32 dw | 1920 × 1080 × 32 |  |
| PW Conv/(1, 1)/(0, 0) | 1 × 1 × 32 × 16 | 1920 × 1080 × 16 |  |
| ReLU | — | 1920 × 1080 × 16 |  |
| DW Conv/(1, 1)/(1, 1) | 3 × 3 × 16 dw | 1920 × 1080 × 16 |  |
| PW Conv/(1, 1)/(0, 0) | 3 × 3 × 16 × 4 | 1920 × 1080 × 4 |  |
| Pixel Shuffle | depth-to-space | 3840 × 2160 × 1 | $Y_C$ |
| Nearest Neighbor | 2 × up-sample | 3840 × 2160 × 1 | $Y_N$ |
| Residual Network | $Y_N + Y_C$ | 3840 × 2160 × 1 | Output $Y_F$ |

As illustrated, the image processing apparatus 10 includes a first pixel information converter, the first line buffer 210, a data aligner, the DW convolution operator 221, the PW convolution operator 223, the compressor 231, the second line buffer 233, the decompressor 235, the DW convolution operator 241, the PW convolution operator 243, the quantizer 250, the weight buffer 260, a second pixel information converter, and a third line buffer.

An image received by the first pixel information converter may include color data. For example, the color data may include RGB channel data and YCbCr channel data.

The first pixel information converter may convert first color data to second color data. Herein, the first color data may include RGB channels, and the second color data may include YCbCr channels. For example, the first pixel information converter may convert RGB channels of an LR input image to YCbCr channels.

The first line buffer 210 may include, for example, four line buffers. The DW convolution operator 221 may perform a 1×5 convolution operation. The second line buffer 233 may include an even-number line buffer and an odd-number line buffer.

The DW convolution operator 241 may perform a 3×3 convolution operation. The second pixel information converter may convert the second color data to the first color data. For example, the second pixel information converter may convert the YCbCr channels to the RGB channels.

The weight buffer 260 may store a parameter, or a filter parameter, that is used for a convolution operation. The weight buffer 260 may update parameters received from convolution operators.

The third line buffer may include a plurality of line buffers. The third line buffer may include, for example, four output line buffers.

Outputs of all the convolution operators may be quantized through the quantizer 250, and all weight parameters may also be quantized through the quantizer 250.

The quantizer 250 may convert a 32-bit floating point to a 10-bit fixed point. The weight buffer 260 may store the quantized weight parameters.

In FIG. 8, arrows indicate respective data paths. That is, illustrated are a data path based on Type 1, and a data path based on Type 2.

The image processing apparatus 10 may operate in a pipeline structure. Herein, a pipeline may indicate a structure in which an output in one step of processing data is connected to an input in a next step of processing the data. Connected steps of processing data may be performed concurrently or in parallel.

That is, components included in the image processing apparatus 10 may operate concurrently or in parallel to process an image. For example, at least one convolution operation of the image processing apparatus 10 may operate in a form of pipeline.

The convolution operators may load convolution filter parameters from the weight buffer 260. Subsequently, the first pixel information converter may extract a YCbCr value from an RGB input stream. The first line buffer 210 may store four rows of an YCbCr LR input image to be used for nearest neighboring point upscaling to obtain an interpolated image for a residual connection at an end of a network.

The data aligner may re-align data of the four line buffers of the first line buffer 210 and the input stream, and generate 3×3 size YCbCr LR patches. A Y channel of the LR patches may be transmitted to a 3×3 convolution layer.

After a first convolution operation, a feature map may pass through a ReLU activation function. Subsequently, an output of the ReLU function may pass through the first convolution operator 220. The first convolution operator 220 may generate a feature map, or an intermediate feature map.

The compressor 231 may compress the intermediate feature map that has passed through a residual block and a ReLU, and the second line buffer 233 may store the compressed feature map.

The decompressor 235 may read data stored in the second line buffer 233, and decompress the read data at a one-delayed line data-enable (DE) timing. The DW convolution operator 241 may perform a 3×3 convolution operation on the decompressed data, and the PW convolution operator 243 may perform a 1×1 convolution operation on an output of the DW convolution operator 241.

After an output of the PW convolution operator 243, the number of channels of a feature map may be reduced by half from 32 to 16. The feature map with the reduced number of channels may pass again through the compressor 231, the second line buffer 233, and the decompressor 235 in sequential order. Subsequently, convolution operations may be performed again by the DW convolution operator 241 and the PW convolution operator 243.

An output of such repeated convolution operations may be configured by four channels used to generate a 2×2 HR patch through a similar method as that used for a sub pixel convolution.

The image processing apparatus 10 may then obtain a final Y ($Y_F$) by adding 2×2 super-resolved Y data ($Y_C$) and 2× up-sampled data ($Y_N$) through a nearest neighbor interpolation method.

To synchronize two timings of $Y_C$ and $Y_N$, the $Y_N$ data may be stored first-in, first-out (FIFO), and read at a same timing as $Y_C$. In addition, CbCr data delayed from the FIFO may also be up-sampled by two times based on the nearest neighbor interpolation method to be transmitted to the second pixel information converter to obtain RGB pixels.

Two output buffers of the third line buffer may store generated 2×2 RGB HR patches, which may be transmitted to a display device at an output timing for each output clock cycle.

To prevent a read/write collision for the 2×2 RGB HR patches using a dual buffering structure for stream processing, four line buffers may be used as the third line buffer.

Figure 9:
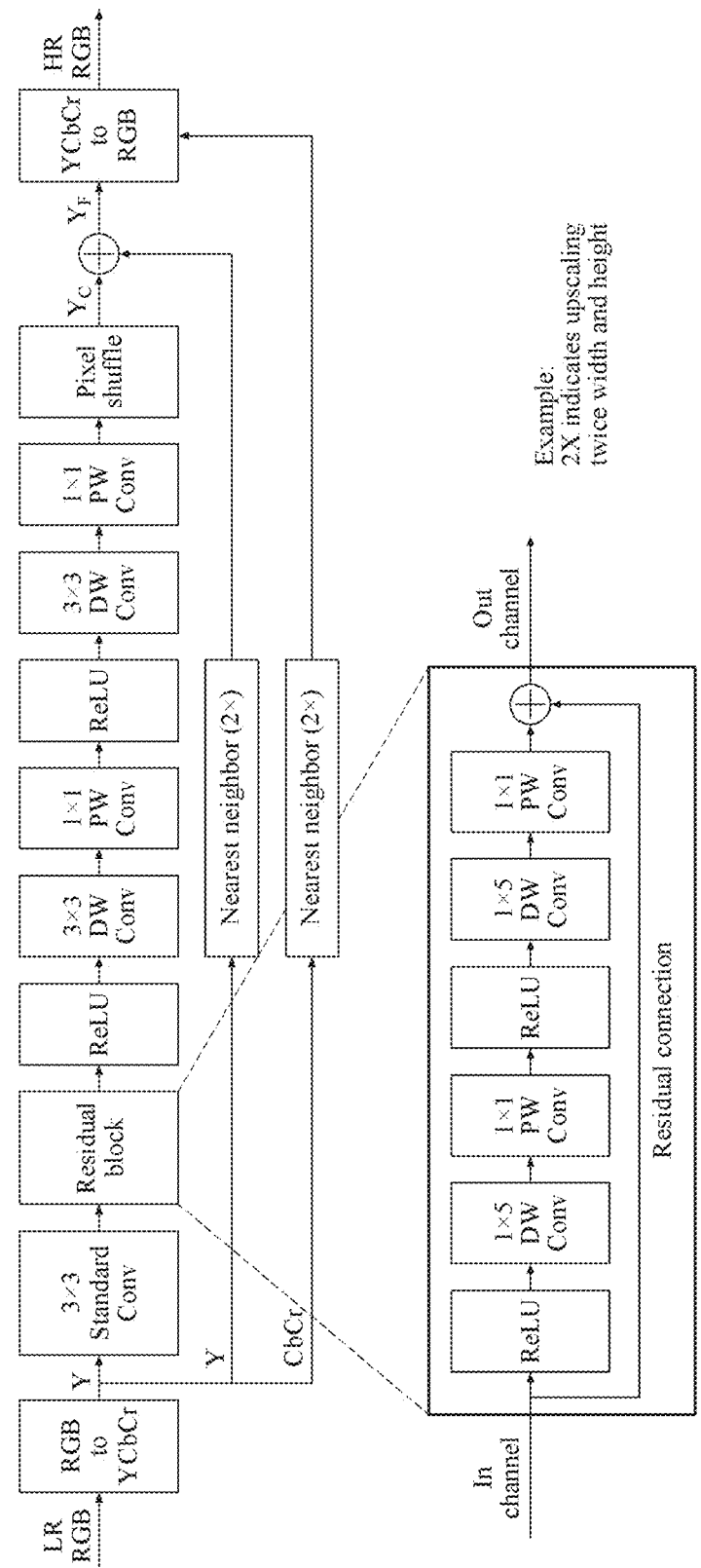
FIG. 9 illustrates an example of an architecture of a neural network used by the image processing apparatus illustrated in FIG. 1.

FIG. 9 illustrates an example of an architecture of a neural network used by an image processing apparatus illustrated in FIG. 1.

Referring to FIG. 9, the image processing apparatus 10 may process an image using a hardware-friendly CNN-based SR network.

The image processing apparatus 10 may process the image using a portion of color data. For example, the image processing apparatus 10 may process the image by inputting only a luminance signal channel (Y) among YCbCr channels to the CNN network. A level of performance of learning using only the Y channel may be similar to a level of performance of learning using RGB channels.

When training the CNN network with the RGB channels, the number of parameters used for the RGB channels may be three times greater than the number of parameters used only for the Y channel in a 2D convolution of a first layer and a PW convolution of a last layer.

Here, color difference signal (Cb, Cr) channel data may be up-scaled using an interpolation method. The interpolation method may include a bicubic interpolation and a nearest neighbor interpolation.

For example, the image processing apparatus 10 may perform the up-scaling using the nearest neighbor interpolation which may be simpler than the bicubic interpolation to reduce complexity and improve hardware efficiency. In addition, the image processing apparatus 10 may train the neural network using a residual learning technique to reduce the complexity.

The image processing apparatus 10 may calculate a final HR image $Y_F$ by adding an interpolated LR image $Y_N$ and an output $Y_C$ of the network. The calculation may be represented by Equation 5.

$$Y_F = Y_N + Y_C \quad \text{[Equation 5]}$$

To use as less convolution filter parameters and line memories as possible, the image processing apparatus 10 may combine a DSC, an 1D horizontal convolution, and a residual connection.

Thus, the number of filter parameters may be approximately 21 times less than an existing SRCNN-Ex, approximately 4.5 times less than a fast SRCNN (FSRCNN), and approximately 1.56 times less than a FSRCNN-s, while levels of PSNR and SSIM performance may be similar to those of the SRCNN-Ex.

As described above with reference to FIG. 9, the image processing apparatus 10 may perform a convolution operation through two 2D convolution layers and one 1D convolution layer. For example, a 2D convolution operation may, be a 3×3 convolution operation, and the 1D convolution operation nay be a 1×5 convolution operation. In this example, a total receptive field size may be 7×15.

Figure 10:
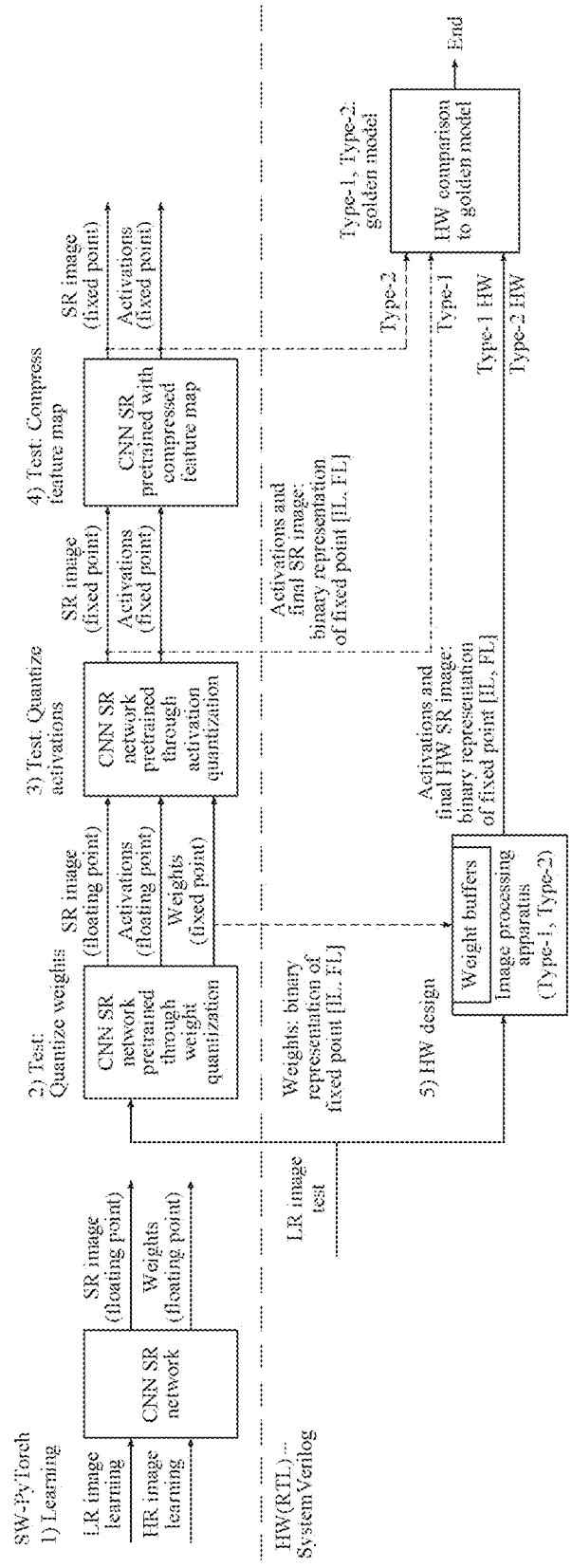
FIG. 10 illustrates an example of a framework for verifying the image processing apparatus illustrated in FIG. 1.

FIG. 10 illustrates an example of a framework for verifying an image processing apparatus illustrated in FIG. 1.

Referring to FIG. 10, performance of the image processing apparatus 10 is evaluated with respect to a general data set, compared to those of a bicubic method and an existing CNN-based SR method. Through such performance evaluation, performance of the image processing apparatus 10 may be compared to those of software-based methods including, for example, SRCNN, SRCNN-Ex, FSRCNN, FSRCNN-s, and very deep SR (VDSR). In addition, performance of the image processing apparatus 10 may be compared to those of other real-time SR hardware in terms of gate count and operating frequency.

A generally used benchmark dataset may be used for learning and tests. An SR network may be trained or learned using 291 images including 90 images from Yang et al. and 200 images from Berkeley segmentation dataset.

For the comparison of performances, test set 1 and test set 2 may be used. Test set 1 may include Set5, Set14, B100, and Urban100, which may be frequently used as an SR benchmark for many methods. Test set 2 may include eight 4K UHD images, and used for tests.

All tests or experiments may be performed with a scale factor of 2 times for SR. A PSNR and an SSIM may be used as a measure or a metric for the evaluation. The SR may be performed for a luminance channel of a YCbCr color space, and thus the PSNR and the SSIM may be calculated using a Y channel of a reconstructed original HR image.

For learning and tests, an LR input image may be intentionally generated through down-sampling from the original HR image using a double scale bicubic interpolation. For learning, 128×128 size sub-images may be randomly cropped. Through rotation, reflection, and scaling, an LR-HR image pair may be augmented.

Weights may be initialized using a uniform distribution, and a bias may not be used to reduce the number of parameters. L1 loss may be used, in lieu of L2 loss, as a cost function.

The SR network suggested herein may be trained or learned using an Adam optimizer.

A learning rate may be set to be 0.0001 and be reduced by 10 for each 50 epochs. During the learning or training, a size of mini-batch may be set to be 2. For a learning or training test, a NVIDIA Titan X graphics processing unit (GPU) of 3.4 gigahertz (GHz) and an Intel Core i7-6700 central processing unit (CPU) may be used.

During calculation of a floating point in a learning or training stage, a weight parameter of the SR network may be quantized from the floating point to a fixed point in a test stage according to Equation 2.

In addition, by quantizing activations of all convolution layers and using a compression method, only feature maps of 3×3 size DW convolution layers may be compressed. An optimal quantization bit for weights and activations may be experimentally discovered, and a quantized weight parameter may be used in the image processing apparatus 10.

In an algorithm stage, a compressed intermediate feature map and a final SR image may be used as a golden model to be compared to a designed hardware simulation result.

Figure 11A:
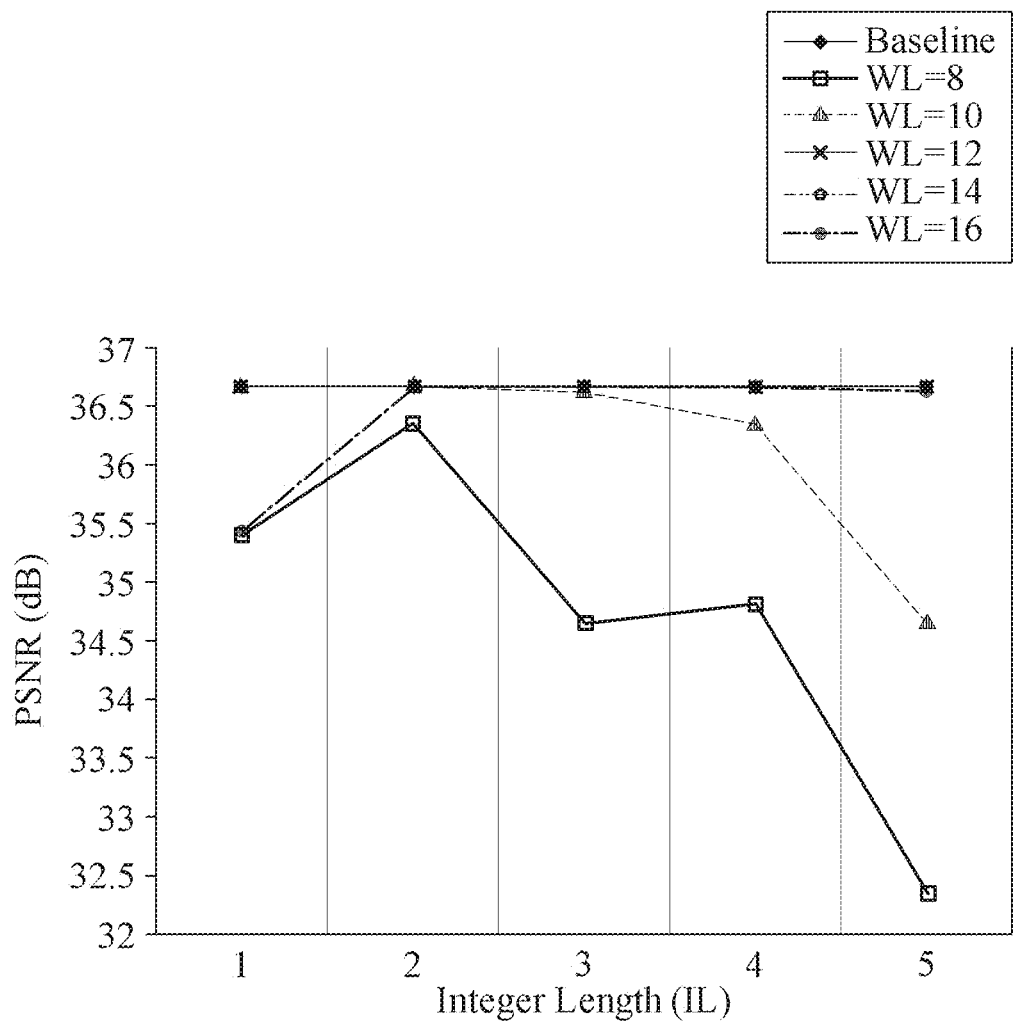
FIG. 11a illustrates an example of performance of the image processing apparatus illustrated in FIG. 1.
Figure 11B:
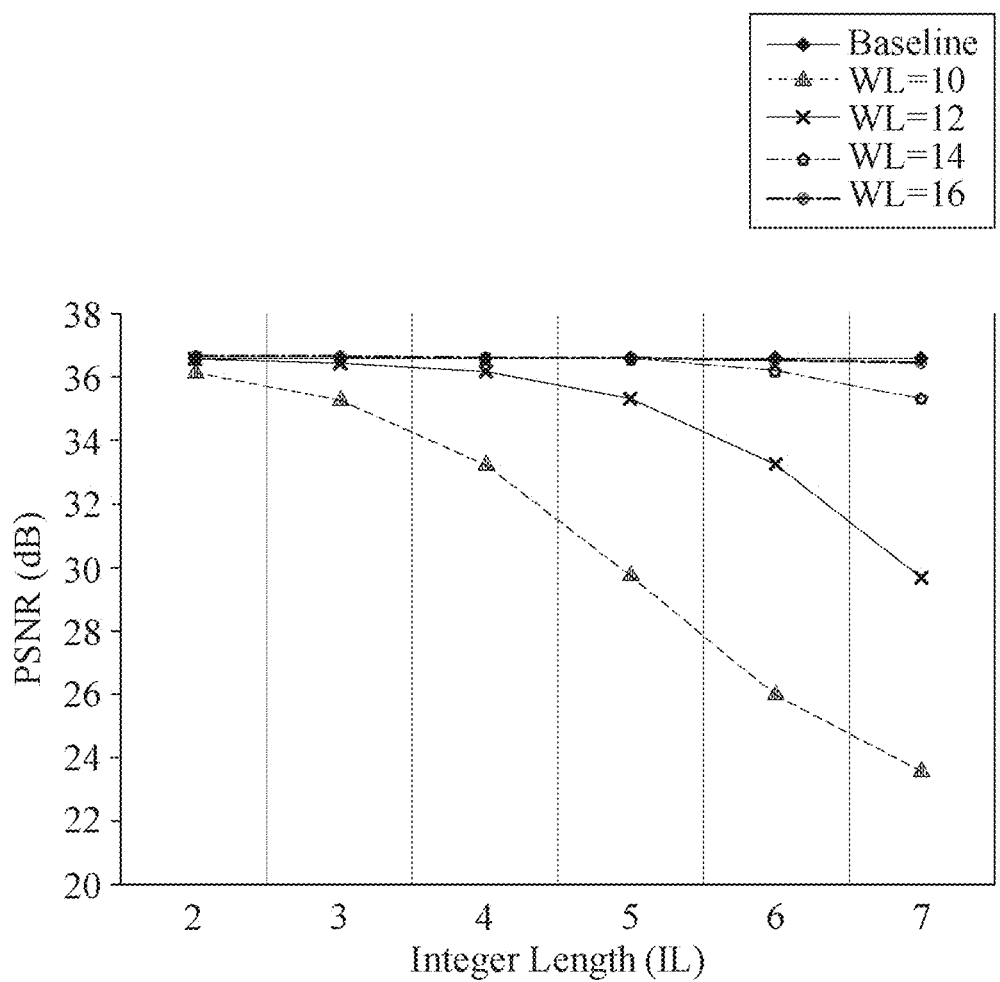
FIG. 11b illustrates another example of performance of the image processing apparatus illustrated in FIG. 1.
Figure 11C:
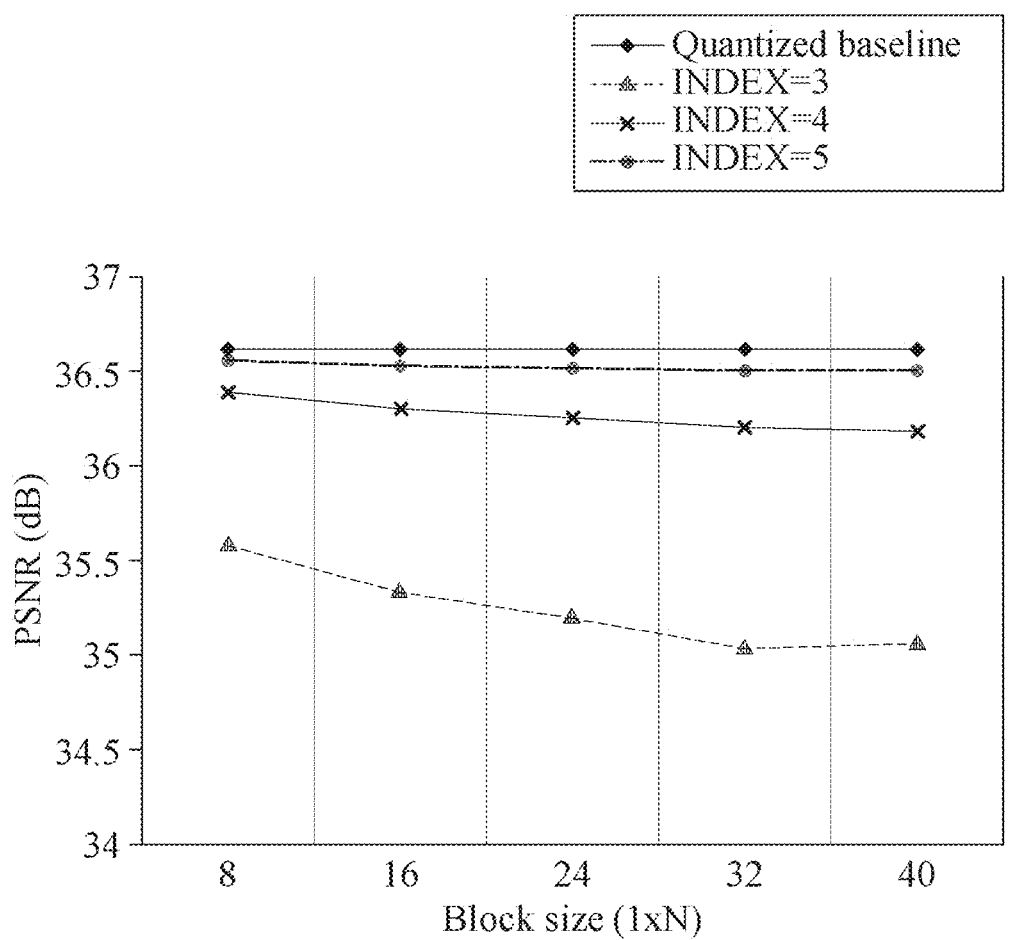
FIG. 11c illustrates still another example of performance of the image processing apparatus illustrated in FIG. 1.

FIG. 11a illustrates an example of performance of an image processing apparatus illustrated in FIG. 1. FIG. 11b illustrates another example of performance of an image processing apparatus illustrated in FIG. 1. FIG. 11c illustrates still another example of performance of an image processing apparatus illustrated in FIG. 1.

Referring to FIGS. 11a through 11c, weight parameters and activations may be quantized for hardware implementation. The quantization of weight parameters and activations may greatly affect a quality of an output image, and thus it may need to discover a desirable quantization bit depth. That is, suitable values for three parameters described above—word length (WL), integer length (IL), and fraction length (FL)—may be required. Thus, experiments may be performed by varying such parameters WL, IL, and FL with respect to various datasets.

FIG. 11a is a graph of PSNR with respect to WL and IL that quantize weight parameter values for a dataset, Set5. It is verified in FIG. 11a that, when a bit depth is greater than or equal to 10, PSNR performance of an SR network may be similar to that in a case that there is no quantization of weights and activations. In addition, it is verified that, the PSNR performance is reduced greatly at IL being 4 (IL=4) or greater with respect to a 10-bit WL.

A FL bit depth may affect more greatly the PSNR performance than an IL bit depth, due to the use of a residual network as represented by Equation 5. For the quantization of weight parameters, the WL bit depth may be set to be 10 bit and the IL bit depth may be set to be 2 bit.

This may also be used for the quantization of activations and the compression of intermediate feature maps.

FIG. 11b is a graph of PSNR performance of an SR network with respect to WL and IL bit depths for the quantization of activations. Based on a result of an experiment as illustrated in FIG. 11b, WL may be set to be 14 bit and IL may be set to be 2 bit for the quantization of activations.

FIG. 11c illustrates a result of an experiment on a compression method applied to a quantized feature map to reduce the use of line memories. The experiment is performed to verify PSNR performance with respect to various block sizes and indices (quantization levels). As a value of a quantization level for the compression decreases, a compression ratio may increase, but the PSNR performance may decrease.

Based on the result illustrated in FIG. 11c, a compromise between line memories requiring a 32-bit block size and a 5-bit index size (quantization level), and the result PSNR may be selected.

Figure 12A:
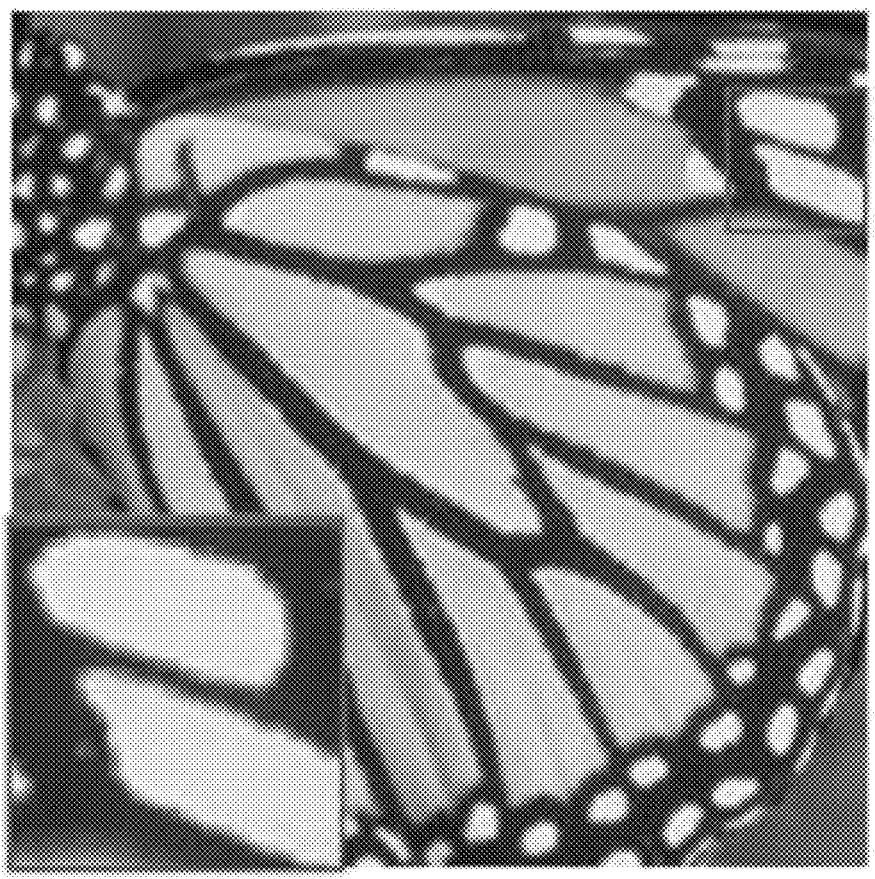
FIG. 12a is an example of an original high-resolution image.
Figure 12B:
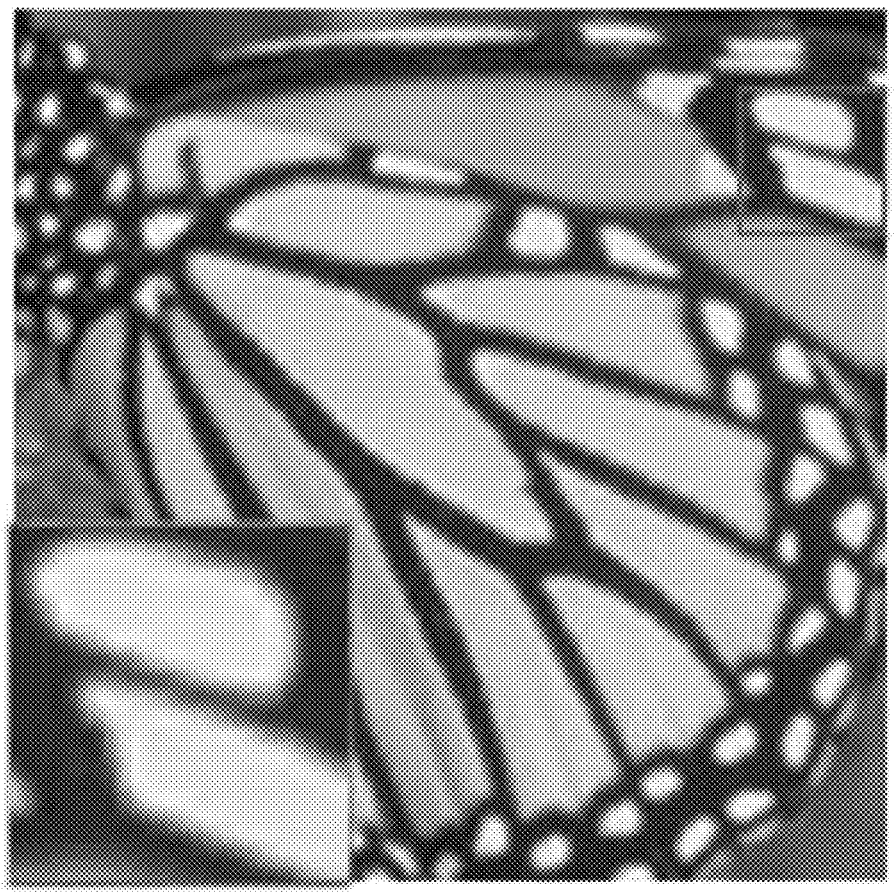
FIG. 12b is an example of an image processed through a bicubic method.
Figure 12C:
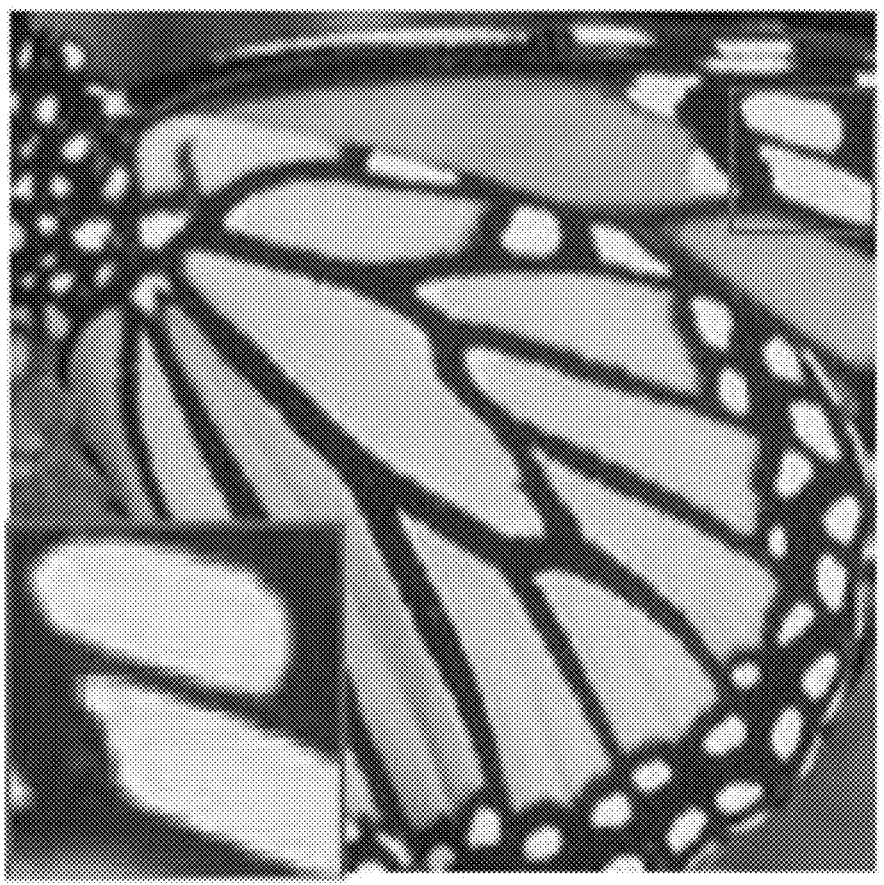
FIG. 12c is an example of an image processed through a super-resolution convolutional neural network (SRCNN) method.

FIG. 12a is an example of an original HR image. FIG. 12b is an example of an image processed through a bicubic method. FIG. 12c is an example of an image processed through an SRCNN method.

Figure 12D:
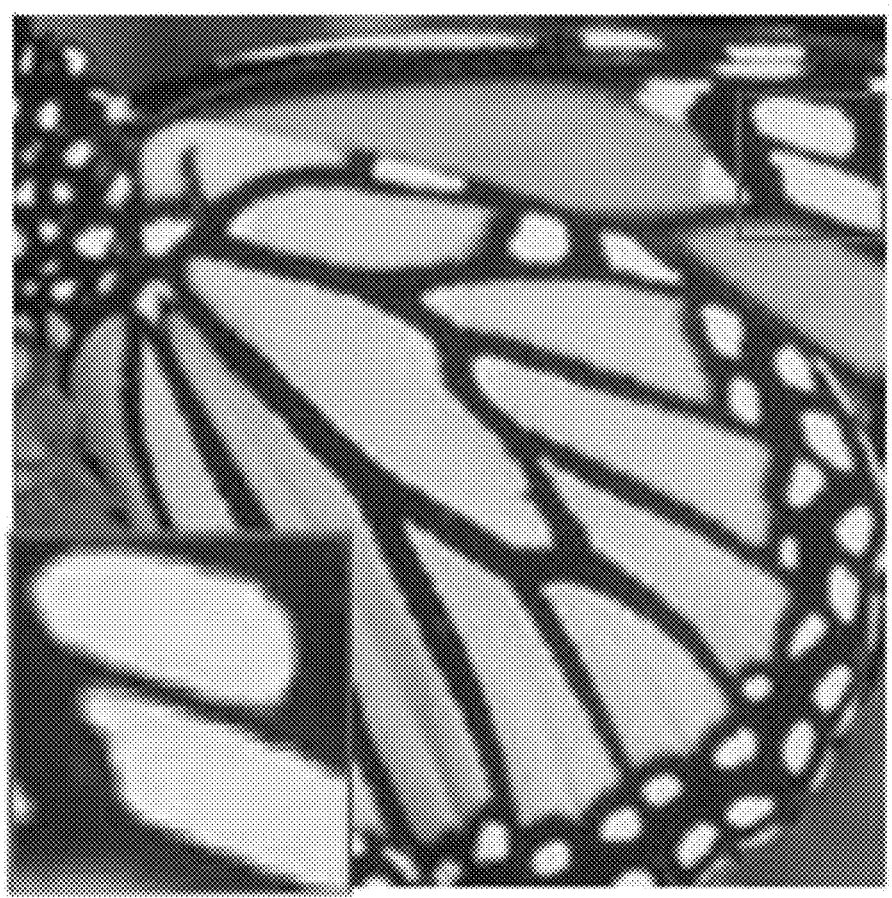
FIG. 12d is an example of an image processed through a SRCNN-Ex method, an extension of the SRCNN method.
Figure 12E:
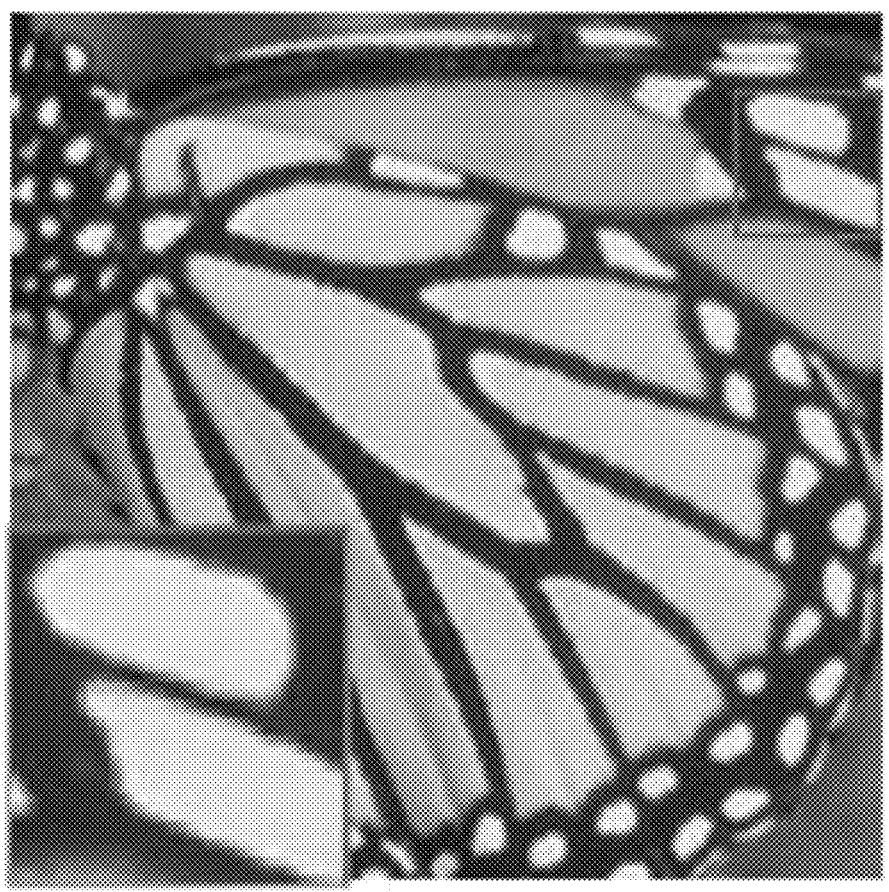
FIG. 12e is an example of an image processed through a fast SRCNN (FSRCNN) method.
Figure 12F:
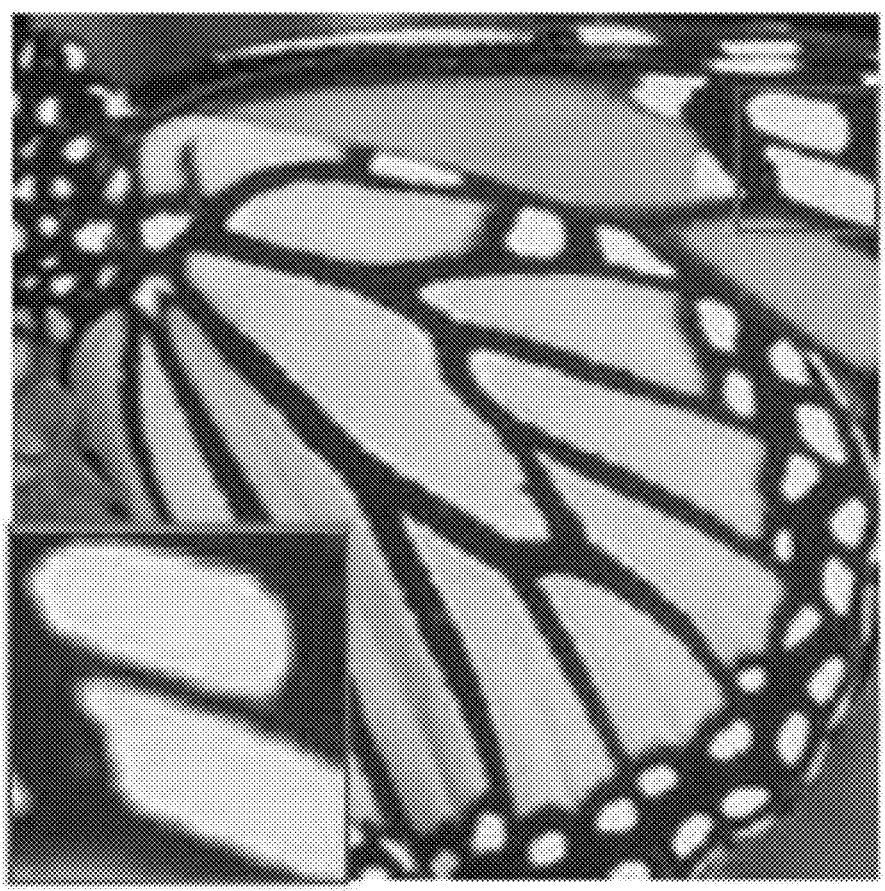
FIG. 12f is an example of an image processed through a FSRCNN-s method, a small model size version of the FSRCNN method.

FIG. 12d is an example of an image processed through an SRCNN-Ex method, an extension of SRCNN. FIG. 12e is an example of an image processed through a fast SRCNN (FSRCNN) method. FIG. 12f is an example of an image processed through a FSRCNN-s method, a small model size version of FSRCNN.

Figure 12G:
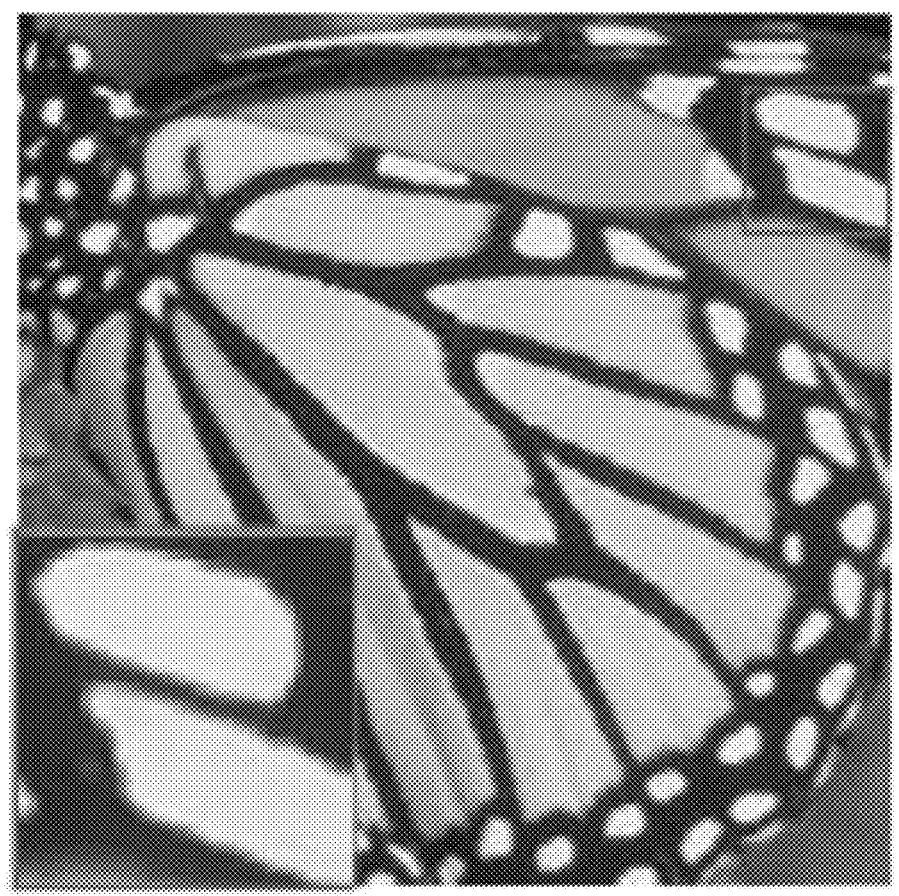
FIG. 12g is an example of an image processed through a very deep super-resolution (VDSR) method.
Figure 12H:
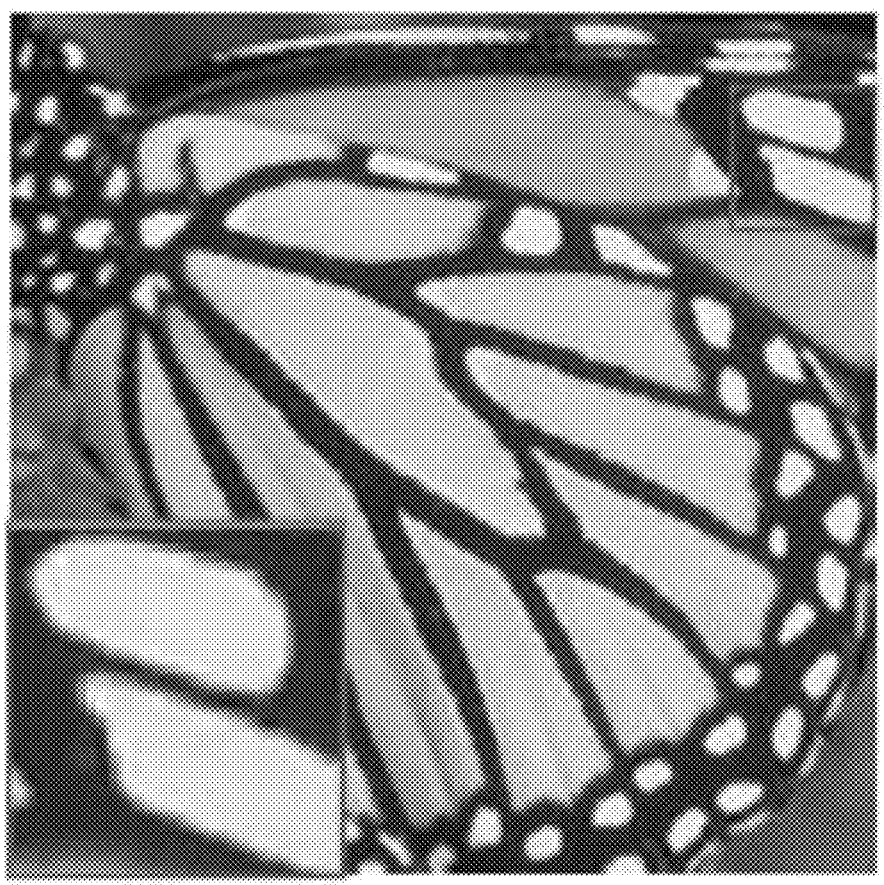
FIG. 12h is an example of an image processed by the image processing apparatus illustrated in FIG. 1 using a quantized weight.

FIG. 12g is an example of an image processed through a VDSR method. FIG. 12h is an example of an image processed by an image processing apparatus illustrated in FIG. 1 using a quantized weight.

Figure 12I:
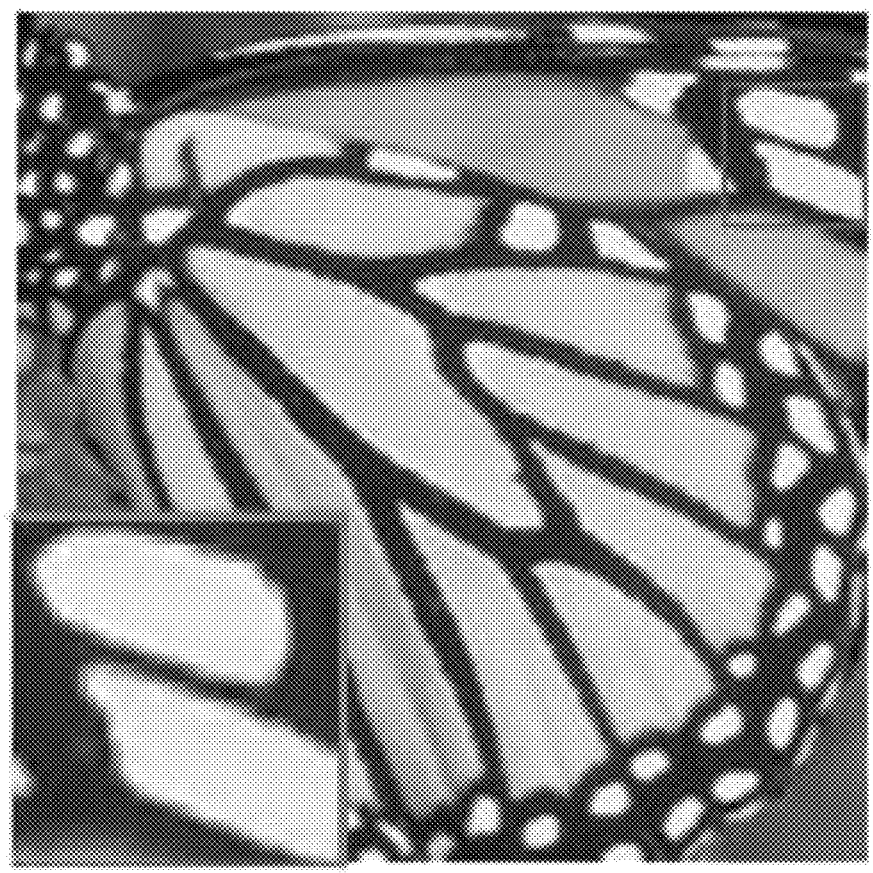
FIG. 12i is an example of an image processed by the image processing apparatus illustrated in FIG. 1 using a quantized weight and activation.
Figure 12J:
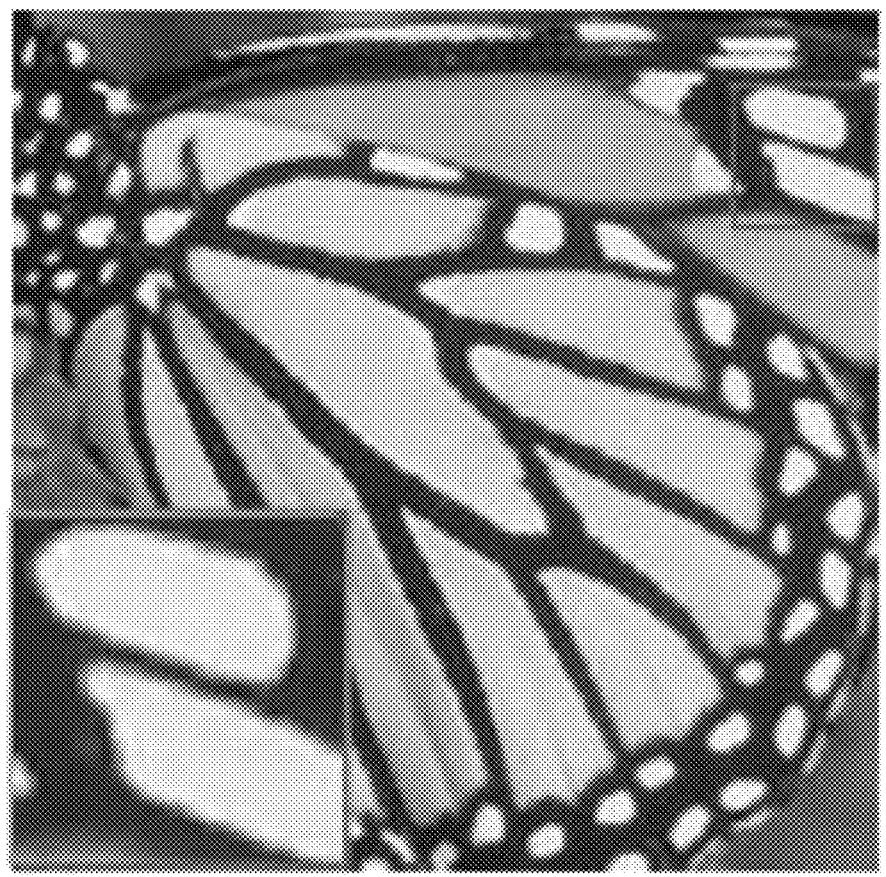
FIG. 12j is an example of an image processed by the image processing apparatus illustrated in FIG. 1 using a quantized weight and activation, and compression of an intermediate feature map.

FIG. 12i is an example of an image processed by an image processing apparatus illustrated in FIG. 1 using a quantized weight and activation. FIG. 12j is an example of an image processed by an image processing apparatus illustrated in FIG. 1 using a quantized weight and activation, and compression of an intermediate feature map.

Figure 13A:
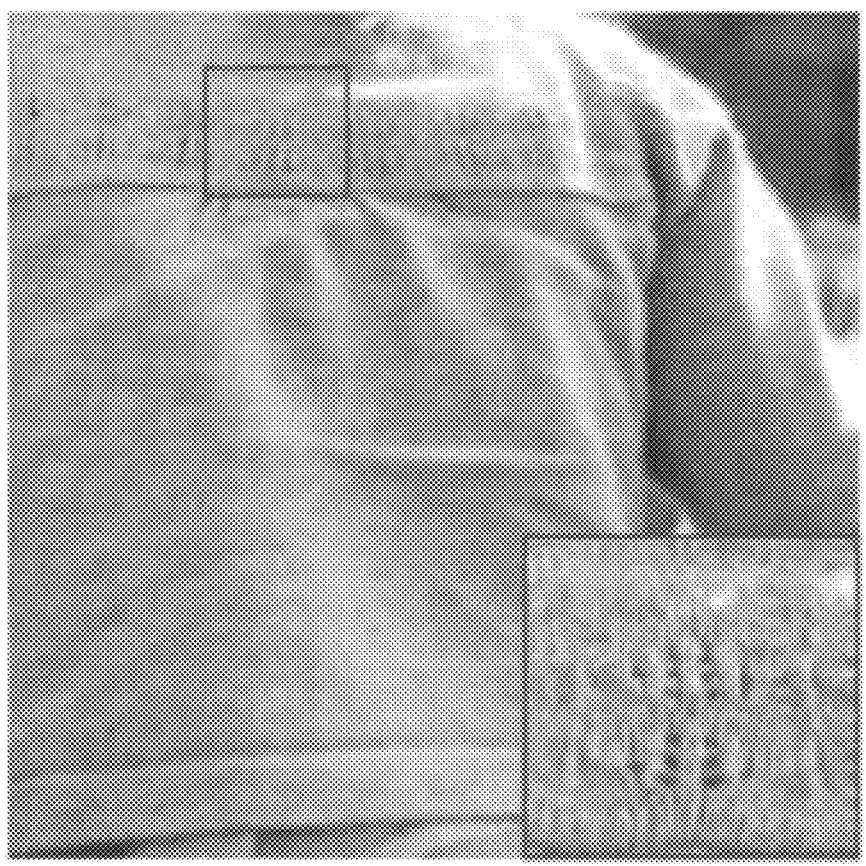
FIG. 13a is another example of an original high-resolution image.
Figure 13B:
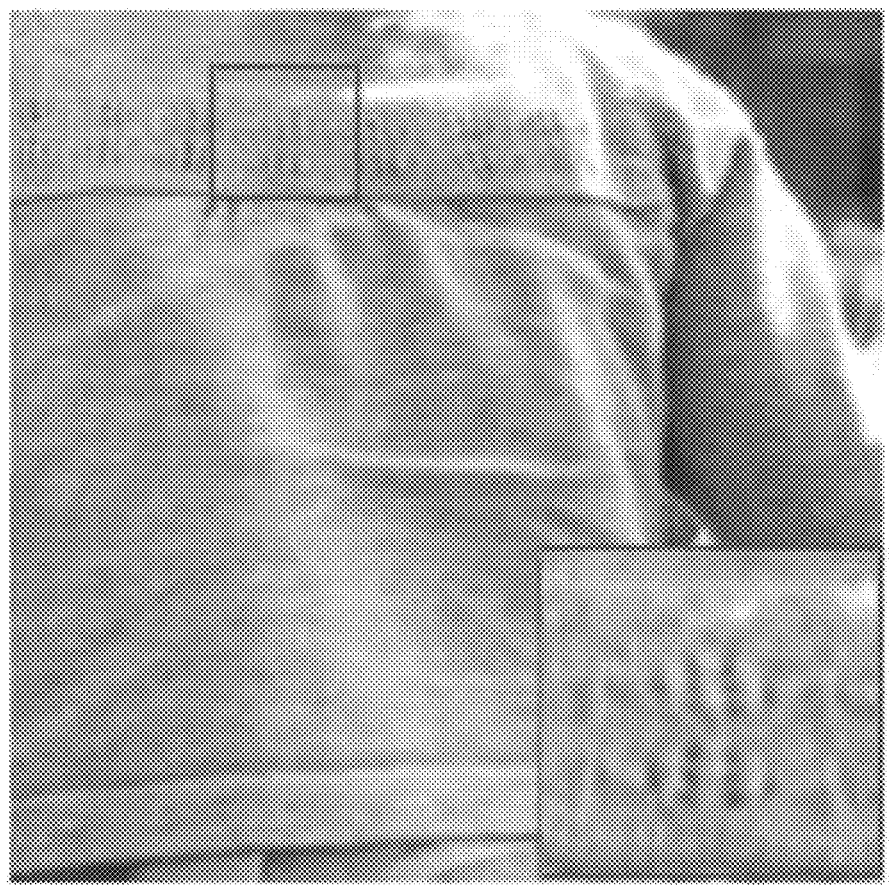
FIG. 13b is another example of an image processed through a bicubic method.
Figure 13C:
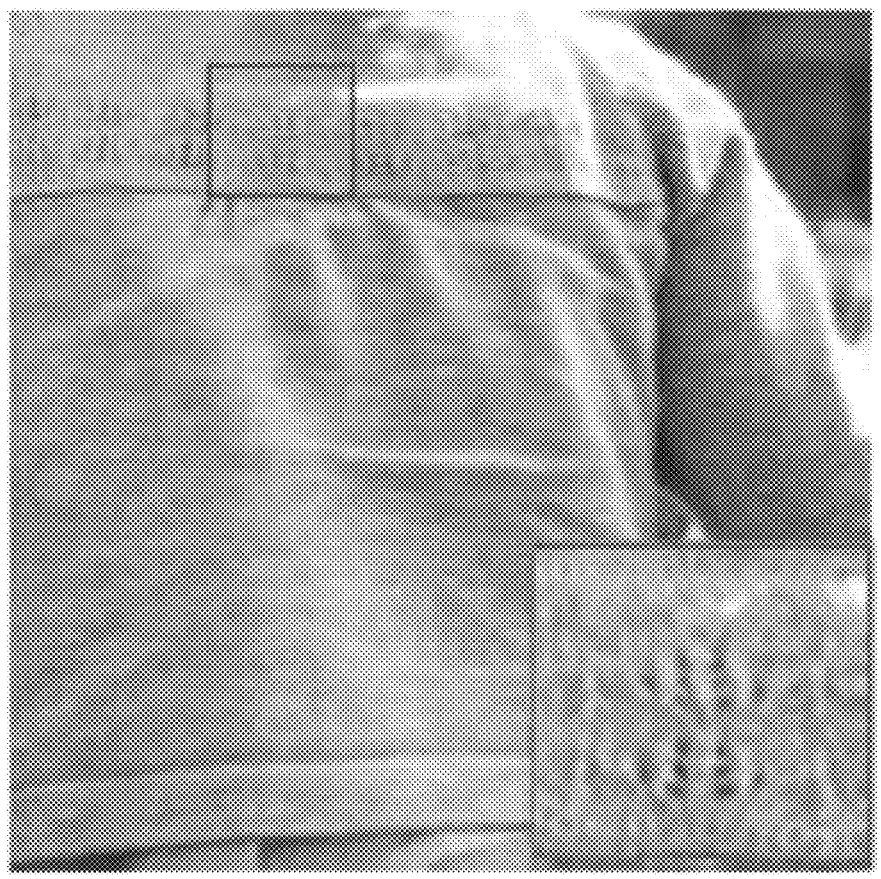
FIG. 13c is another example of an image processed through a SRCNN method.

FIG. 13a is another example of an original HR image. FIG. 13b is another example of an image processed through a bicubic method. FIG. 13c is another example of an image processed through a SRCNN method.

Figure 13D:
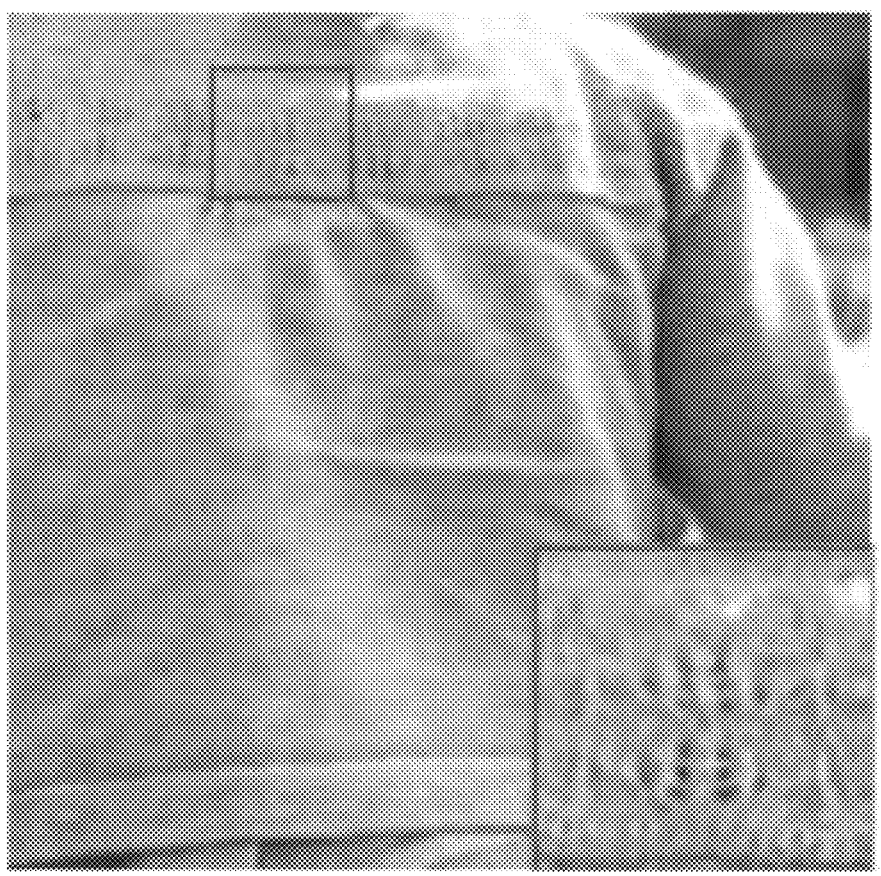
FIG. 13d is another example of an image processed through a SRCNN-Ex method.
Figure 13E:
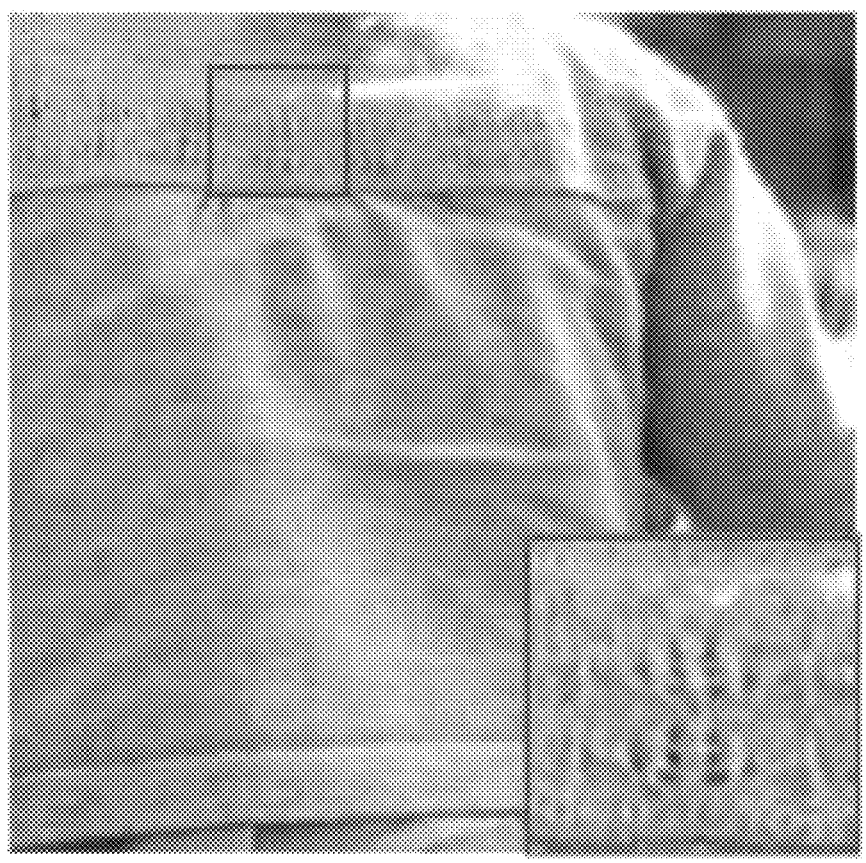
FIG. 13e is another example of an image processed through a FSRCNN method.
Figure 13F:
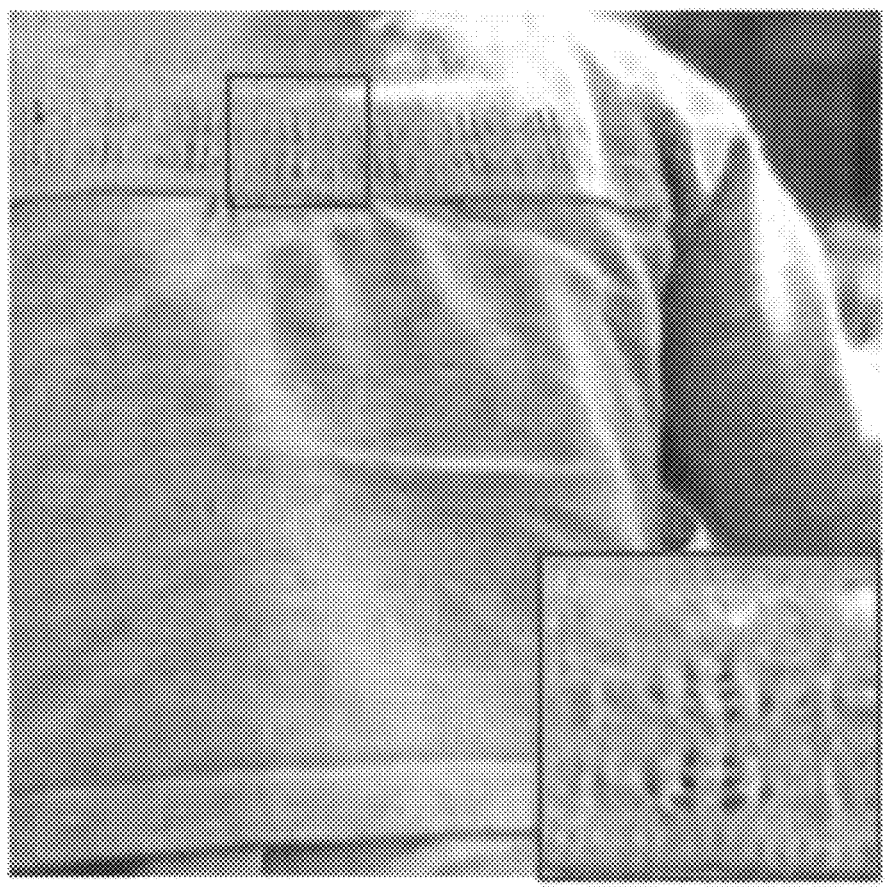
FIG. 13f is another example of an image processed through a FSRCNN-s method.

FIG. 13d is another example of an image processed through an SRCNN-Ex method. FIG. 13e is another example of an image processed through an FSRCNN method. FIG. 13f is another example of an image processed through a FSRCNN-s method.

Figure 13G:
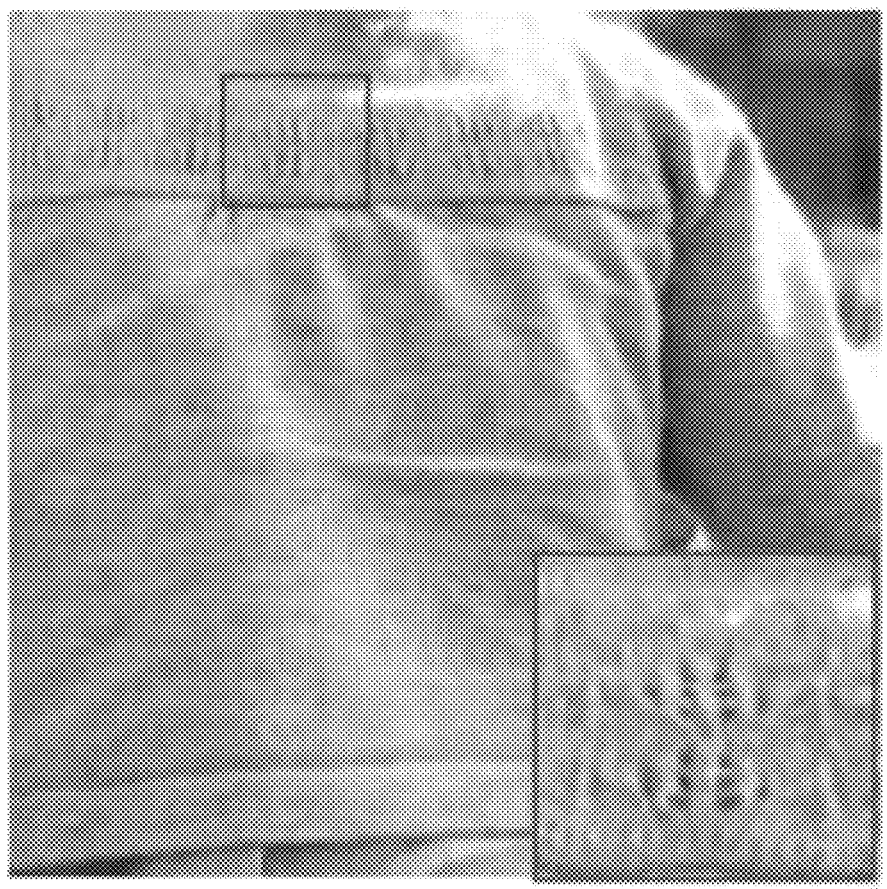
FIG. 13g is another example of an image processed through a VDSR method.
Figure 13H:
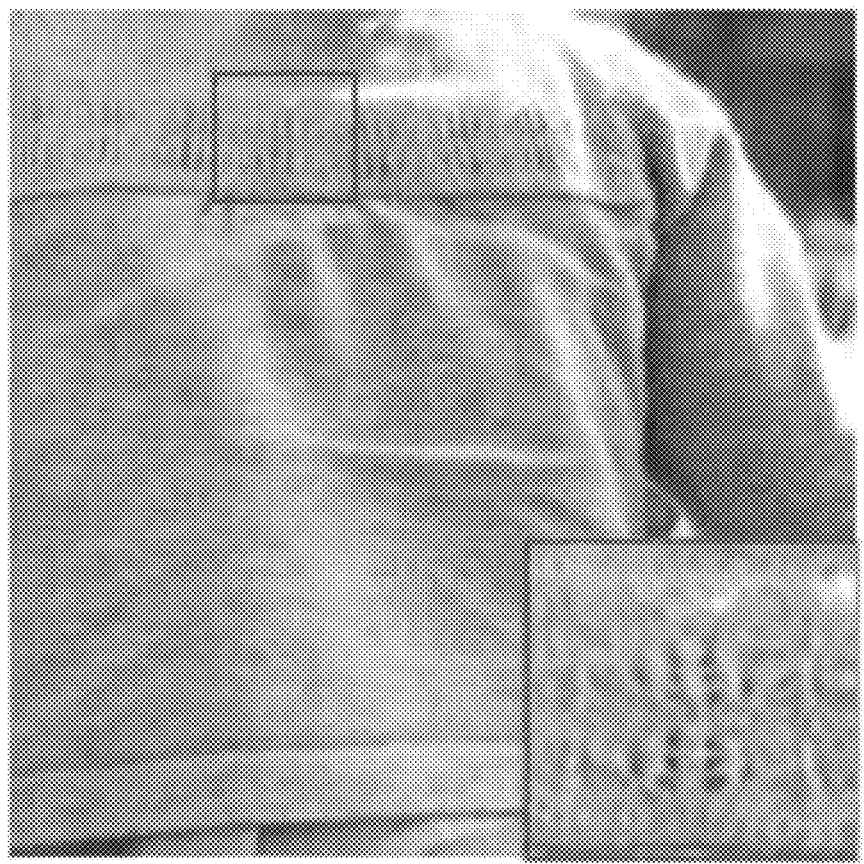
FIG. 13h is another example of an image processed by the image processing apparatus illustrated in FIG. 1 using a quantized weight.

FIG. 13g is another example of an image processed through a VDSR method. FIG. 13h is another example of an image processed by an image processing apparatus illustrated in FIG. 1 using a quantized weight.

Figure 13I:
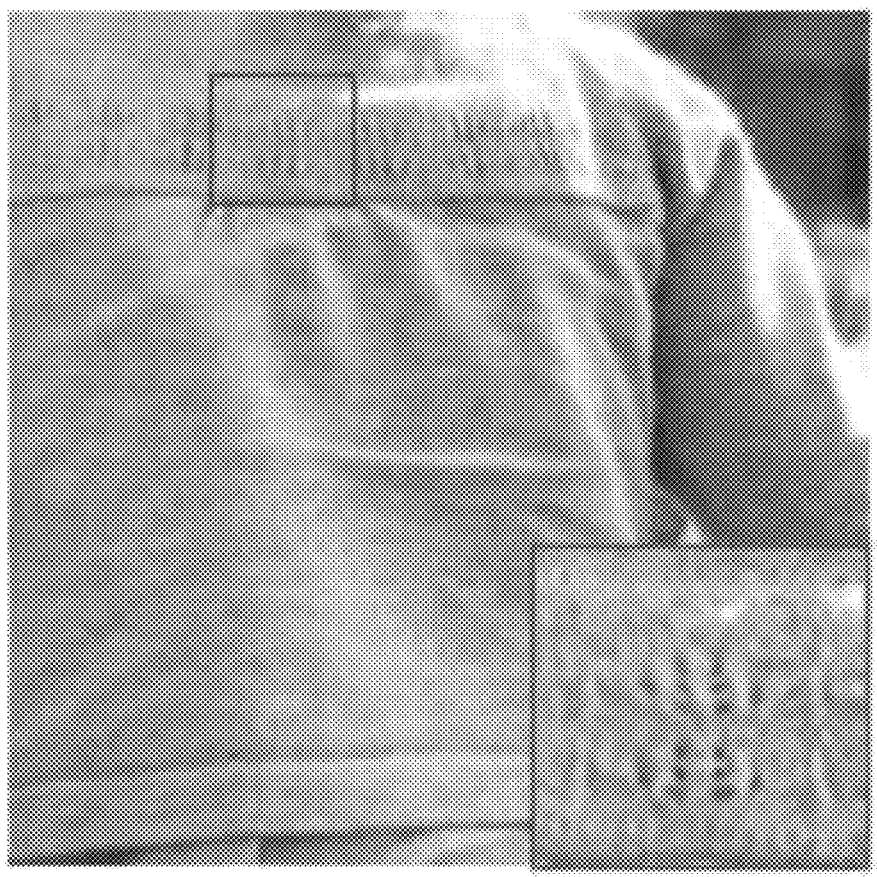
FIG. 13i is another example of an image processed by the image processing apparatus illustrated in FIG. 1 using a quantized weight and activation.
Figure 13J:
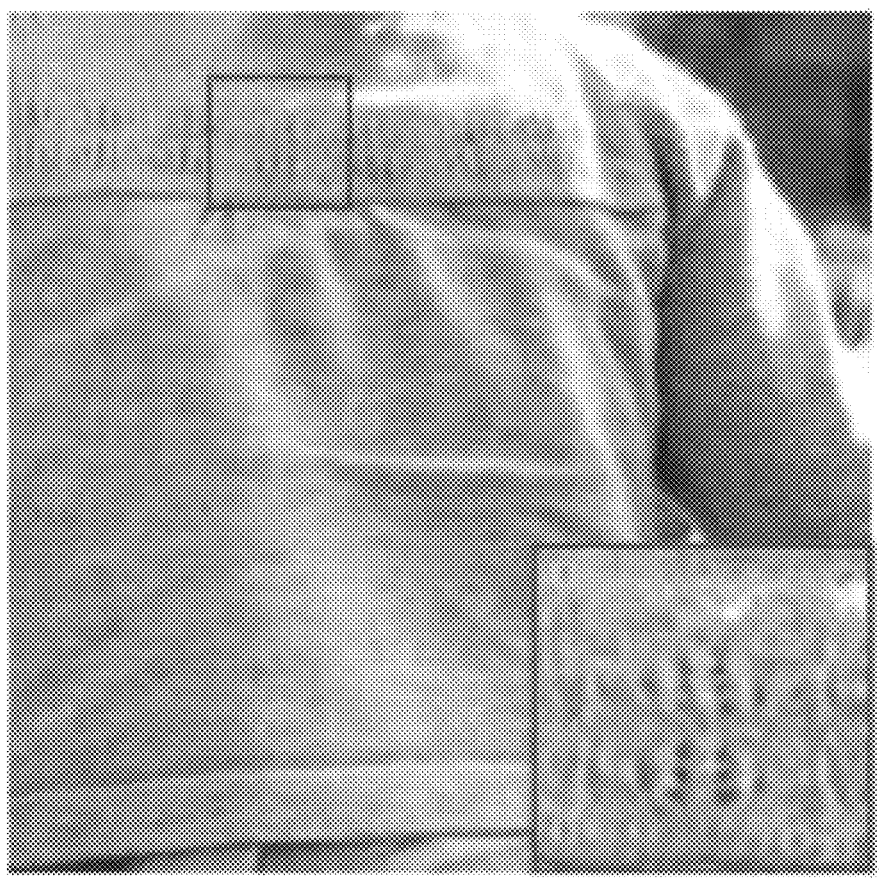
FIG. 13j is another example of an image processed by the image processing apparatus illustrated in FIG. 1 using a quantized weight and activation, and compression of an intermediate feature map.

FIG. 13i is another example of an image processed by an image processing apparatus illustrated in FIG. 1 using a quantized weight and activation. FIG. 13j is another example of an image processed by an image processing apparatus illustrated in FIG. 1 using a quantized weight and activation, and compression of an intermediate feature map.

Referring to FIGS. 12a through 13j, performance of the image processing apparatus 10 is verified when using a bicubic method and other CNN-based SR methods including SRCNN, SRCNN-Ex, FSRCNN, and FSRCNN-s based methods. A MATLAB™ source code which is publicly usable for SRCNN, SRCNN-Ex, FSRCNN, and FSRCNN-s may be used, and the image processing apparatus 10 may be implemented using PyTorch.

For a fair comparison, boundaries of a reconstructed HR image and an original image may be excluded from PSNR and SSIM calculations. All the methods may be performed on a CPU platform.

An open code of the VDSR is executable only on a GPU platform, and thus a third-party code executed on the CPU platform may be used to measure PSNR and SSIM and a runtime.

A runtime of the image processing apparatus 10 may be measured based on software implementation using PyTorch.

Table 4 illustrates mean PSNR and SSIM values of the SR method that are compared to four benchmark datasets.

TABLE 4

| Methods | Bicubic | | SRCNN | | SRCNN-Ex | | FSRCNN | | FSRCNN-s | | VDSR | |
|---|---|---|---|---|---|---|---|---|---|---|---|---|
| Number of parameters | — | | 8K | | 57K | | 12K | | 4K | | 665K | |
| Weight bit | — | | 32-bit | | 32-bit | | 32-bit | | 32-bit | | 32-bit | |
| Activation bit | — | | 32-bit | | 32-bit | | 32-bit | | 32-bit | | 32-bit | |
| Dataset | PSNR | SSIM | PSNR | SSIM | PSNR | SSIM | PSNR | SSIM | PSNR | SSIM | PSNR | SSIM |
| Set-5 | 33.66 | 0.9299 | 36.34 | 0.9521 | 36.66 | 0.9542 | 37.00 | 0.9557 | 36.57 | 0.9531 | 37.53 | 0.9587 |
| Set-14 | 30.24 | 0.8688 | 32.18 | 0.9039 | 32.42 | 0.9063 | 32.63 | 0.9086 | 32.28 | 0.9049 | 33.03 | 0.9124 |
| B100 | 29.56 | 0.8431 | 31.11 | 0.8835 | 31.36 | 0.8870 | 31.50 | 0.8909 | 31.23 | 0.8866 | 31.90 | 0.8960 |
| Urban100 | 26.88 | 0.8403 | 29.09 | 0.8897 | 29.50 | 0.8946 | 29.85 | 0.9010 | 29.23 | 0.8914 | 30.76 | 0.9140 |

| Methods | Image processing apparatus (baseline) | | Image processing apparatus (W) | | Image processing apparatus Type-1 (W + A) | | Image processing apparatus Type-2 (W + A) | |
|---|---|---|---|---|---|---|---|---|
| Number of parameters | 2.56K | | | | | | | |
| Weight bit | 32-bit | | 10-bit | | 10-bit | | 10-bit | |
| Activation bit | 32-bit | | 32-bit | | 14-bit | | 14-bit | |
| Dataset | PSNR | SSIM | PSNR | SSIM | PSNR | SSIM | PSNR | SSIM |
| Set-5 | 36.66 | 0.9548 | 36.64 | 0.9544 | 36.64 | 0.9543 | 36.51 | 0.9520 |
| Set-14 | 32.52 | 0.9073 | 32.52 | 0.9071 | 32.47 | 0.9070 | 32.46 | 0.9055 |
| B100 | 31.32 | 0.8880 | 31.32 | 0.8876 | 31.31 | 0.8877 | 31.27 | 0.8864 |
| Urban100 | 29.34 | 0.8943 | 29.33 | 0.8942 | 29.32 | 0.8939 | 29.28 | 0.8916 |

Referring to Table 4 above, it is verified that the image processing apparatus 10 has a greater performance compared to the FSRCNN-s, and occupies the number of filter parameters which is only 64% of that of the FSRCNN-s. In addition, it is verified that there is no performance degradation of the image processing apparatus 10 even after quantization of weight parameter values and activations.

Although there is a performance degradation of approximately 0.1 dB in PSNR when applying feature map compression to a network of the image processing apparatus 10, a space of required line memories may be reduced by a factor of approximately 2.58 times.

Table 5 illustrates a result of comparing the image processing apparatus 10 and another CNN-based SR method in terms of an average computation time of PSNR and SSIM of test set-2 including a 4K UHD test image.

TABLE 5

| Methods | Bicubic | | SRCNN | | SRCNN-Ex | | FSRCNN | | FSRCNN-s | | VDSR | |
|---|---|---|---|---|---|---|---|---|---|---|---|---|
| HW implementation | FPGA, ASIC | | N/A | | N/A | | N/A | | N/A | | N/A | |
| Average computation time (sec) | — | | CPU 277.6 | GPU 1.052 | CPU 288.0 | GPU 1.256 | CPU 324.4 | GPU 0.583 | CPU 146.4 | GPU 0.518 | CPU 124.3 | GPU 2.851 |
| Image | PSNR | SSIM | PSNR | SSIM | PSNR | SSIM | PSNR | SSIM | PSNR | SSIM | PSNR | SSIM |
| Balloon | 33.79 | 0.9409 | 35.37 | 0.9582 | 35.55 | 0.9594 | 35.74 | 0.9607 | 35.47 | 0.9591 | 35.99 | 0.9608 |
| Children | 33.56 | 0.9123 | 34.91 | 0.9272 | 34.97 | 0.9280 | 35.09 | 0.9291 | 34.92 | 0.9275 | 35.28 | 0.9296 |
| Constance | 31.98 | 0.9271 | 32.84 | 0.9436 | 32.94 | 0.9447 | 33.01 | 0.9460 | 32.38 | 0.9439 | 33.22 | 0.9470 |
| Lake | 30.1 | 0.8527 | 31.47 | 0.9004 | 31.68 | 0.9033 | 31.74 | 0.9047 | 31.58 | 0.9019 | 31.37 | 0.9057 |
| Louvre | 35.63 | 0.9476 | 38.2 | 0.9666 | 38.39 | 0.9677 | 38.93 | 0.9699 | 38.35 | 0.9673 | 39.36 | 0.9708 |
| Medieval | 29.68 | 0.9128 | 31.49 | 0.9424 | 31.76 | 0.9453 | 31.88 | 0.9464 | 31.60 | 0.9431 | 32.17 | 0.9482 |
| High-rise building | 29.48 | 0.9103 | 32.23 | 0.9434 | 32.75 | 0.9470 | 33.04 | 0.9488 | 32.67 | 0.9458 | 33.16 | 0.9496 |
| Supercar | 29.63 | 0.9453 | 32.22 | 0.9663 | 32.81 | 0.9699 | 33.00 | 0.9703 | 32.55 | 0.9679 | 33.20 | 0.9705 |
| Average | 31.74 | 0.9199 | 33.59 | 0.9436 | 33.86 | 0.9457 | 34.05 | 0.9470 | 33.75 | 0.9446 | 34.28 | 0.9477 |

| Methods | Image processing apparatus (baseline) | | Image processing apparatus (W) | | Image processing apparatus Type-1 (W − A) | | Image processing apparatus Type-2 (W + A) | |
|---|---|---|---|---|---|---|---|---|
| HW implementation | N/A | | | | FPGA 0.0166 (60 fps) | | | |
| Average computation time (sec) | CPU 2.3 | GPU 0.050 | CPU 2.62 | GPU 0.057 | | | | |
| Image | PSNR | SSIM | PSNR | SSIM | PSNR | SSIM | PSNR | SSIM |
| Balloon | 35.59 | 0.9601 | 35.589 | 0.9599 | 35.587 | 0.9599 | 35.550 | 0.9589 |
| Children | 35.00 | 0.9288 | 34.997 | 0.9283 | 34.995 | 0.9283 | 34.947 | 0.9265 |
| Constance | 32.93 | 0.9449 | 32.926 | 0.9446 | 32.924 | 0.9445 | 32.911 | 0.9440 |

TABLE 5-continued

|  | | | | | | | | |
|---|---|---|---|---|---|---|---|---|
| Lake | 31.57 | 0.9019 | 31.565 | 0.9016 | 31.561 | 0.9015 | 31.532 | 0.9006 |
| Louvre | 38.33 | 0.9680 | 38.320 | 0.9677 | 38.312 | 0.9676 | 38.234 | 0.9668 |
| Medieval | 31.61 | 0.9443 | 31.598 | 0.9437 | 31.596 | 0.9437 | 31.561 | 0.9427 |
| High-rise building | 32.57 | 0.9462 | 32.562 | 0.9458 | 32.550 | 0.9457 | 32.479 | 0.9439 |
| Supercar | 32.38 | 0.9631 | 32.370 | 0.9677 | 32.362 | 0.9676 | 32.308 | 0.9658 |
| Average | 33.75 | 0.9453 | 33.740 | 0.9449 | 33.736 | 0.9448 | 33.690 | 0.9437 |

It is verified that the image processing apparatus 10 may reconstruct an HR image of a quality that equals to that obtained using the other SR methods. Regarding a runtime, a relatively longer runtime may be used because open codes of the RCNN, the SRCNN-Ex, the FSRCNN, and the FSRCNN-s are implemented in MATLAB and may not be optimized on a CPU platform.

For a fair comparison, a network used by the image processing apparatus 10 may also be implemented in TensorFlow, and other codes may be written in TensorFlow and a runtime may be measured in a GPU platform.

Referring to Table 5 above, runtimes measured by a GPU for various CNN-based SR methods including the image processing apparatus 10 are verified. A runtime of the image processing apparatus 10 run in the GPU is measured as approximately 50 ms, which may be faster about three times compared to FPGA implementation.

FIGS. 12a through 12j are images reconstructed using five CNN-based SR methods including a bicubic method and the image processing apparatus 10, and cropped regions thereof. It is verified that, although the image processing apparatus 10 uses the least number of parameters, a result HR image has a sharp edge and well-recognizable with less artifacts.

FIGS. 13a through 13j are cropped regions of an HR image reconstructed from a 4K UHD resolution image of a child. It is verified that a visual quality obtained by the image processing apparatus 10 and those obtained by other CNN-based SR methods are similar.

Figure 14:
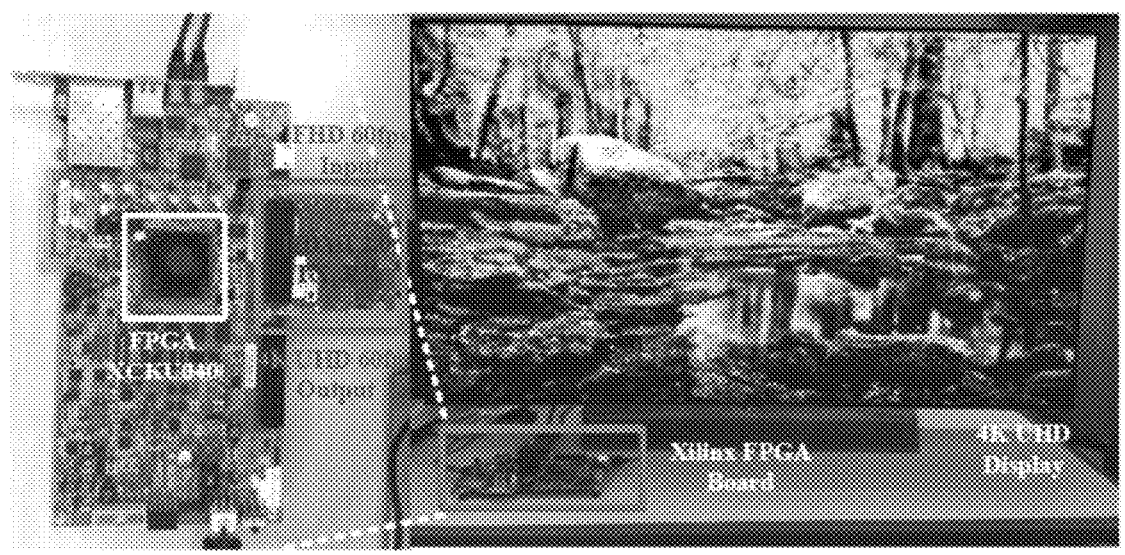
FIG. 14 illustrates an example of an implementation of super-resolution (SR) hardware by a field programmable gate array (FPGA).

FIG. 14 illustrates an example of an implementation of SR hardware by an FPGA.

Referring to FIG. 14, a prototype, of the image processing apparatus 10 implemented on an FPGA is verified. Table 6 illustrates details of implementation of methods by Lee and Yang, and super-interpolation (SI), and the implementation of the image processing apparatus 10.

TABLE 6

| Thesus | Lee | Yang | Kim | Image processing apparatus | |
|---|---|---|---|---|---|
| Methods | Sharp Filter Lagrange | ANR | Edge Orientation Learn Linear Mappings | CNN Type-1 HW No compression | Type-2 HW Compression |
| FPGA device or CMOS technology | 0.13 μm | Altera EP4SGX530   90 nm | Xilinx XCKU040   0.13 μm | Xilinx XCKU040 | |
| FPGA resource or equivalence gate count* | 5.1K | N/A   1,985K | Slice LUTs: 3,395   159K Slice Regs: 1,952 DSP Blocks: 108 | Slice LUTs: 110K   Slice LUTs: 151K Slice Regs: 102K   Slice Regs: 121K DSP Blocks: 1920   DSP Blocks: 1920 | |
| Line buffer | 4 (input) | 5 (input) 24 (internal) 8 (output) | 2 (input) 4 (output) | 4 (input) 96 (internal) 4 (output) | |
| Memory size (Bytes) | N/A | 235K | 92K | 392K | |
| Max frequency (MHz) | 431 | 124.4 | 150   220 | 1550 | |
| Throughput (Mpixels/s) | 431 | 124.4 | 600   880 | 600 | |
| Supported scale | 2X, 3X | 2X | 2X | 2X | |
| PSNR   Set5 | N/A | 33.83 | 34.78 | 36.64 | |
| (dB)    Set14 | N/A | 29.77 | 31.63 | 32.47 | |
| Target resolution | 4K UHD (30 fps) | FHD (60 fps) | 4K UHD (60 fps) | 4K UHD (60 fps) | |

*2 input NAND gates are counted as a single equivalence gate.

Lee et al. proposed hardware using a Lagrange interpolation method using a sharpening algorithm that may obtain a 4K UHD video stream from an HD and FHD stream at 30 fps.

An HW architecture proposed by Yang may require an intermediate image of a target resolution to generate a high-frequency patch using a dictionary based on anchored neighborhood regression (ANR), and obtain an FHD at 60 fps.

A machine learning-based SI HW architecture may be based on linear mapping using an edge direction analysis that directly reconstruct an HR image through a high-frequency restoration, without requiring an intermediate image.

The image processing apparatus 10 may be implemented using SystemVerilog of the FPGA. An output clock speed of the image processing apparatus 10 may be four times greater than an input clock speed thereof. This may be because an FHD (over 4K UHD) operating frequency ratio is generally ¼.

The image processing apparatus 10 may process four pixels per clock cycle and support a 4K UHD video stream at 60 fps, and be implemented based on a restrictive condition applied to a stage of incorporating a 150 MHz target operating frequency and Vivado Design Suite (2015.4) and to a stage of placing and routing (P&R).

In addition, Xilinx Kintex UltraScale FPGA KCU105 evaluation board and TED's HDMI expansion card may be used to support an FHD input and a 4K UHD output video interface to verify the implemented SR hardware.

Two types of SR HW may be provided to the image processing apparatus 10. The two types may include Type-1 to which feature map compression is not applied, and Type-2 to which the feature map compression is applied.

In Type-1, a 110K slice LUT and a 102K slice register that occupy 45.38% of all slice LUTs and 21.08% of all slice registers in a XCKU040 FPGA device may be used.

In Type-2, a 151K slice LUT and a 121K slice register that occupy 62.6% of all the slice LUTs and 24.97% of all the slice registers may be used.

In addition, both Type-1 and Type-2 may maximally use a 1,920 DSP block in the XCKU040 FPGA device of the KCU105 evaluation board.

Type-2 may reduce on-chip memory usage, for example, block RAM in the FPGA, by approximately 50% of that of Type-1. Type-2 may further use approximately 38% of the slice LUTs and approximately 18% of the slice registers to implement two compressors 231 and six decompressor 235, compared to Type-1.

Although the image processing apparatus 10 may require a greater number of line memories and gates compared to a non-CNN-based SR method, it may reconstruct a 4K UHD HR image of a considerably higher quality in real time at a speed of 60 fps.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such a parallel processor.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An image processing apparatus comprising:
   a receiver configured to receive an image;
   at least one first line buffer configured to output the image to be image lines of a line unit;
   a first convolution operator configured to generate feature maps by performing convolution operation on the output image lines; and
   a feature map processor configured to store each generated feature map in at least one line unit and process the feature maps stored in the at least one line unit to be output in a two- or higher-dimensional form.

2. The image processing apparatus of claim 1, wherein the first convolution operator is embodied in a residual block to learn residual signals and output the learned residual signals.

3. The image processing apparatus of claim 1, wherein the first convolution operator comprises:
   at least one one-dimensional (1D) convolution operator configured to perform 1D convolution operation.

4. The image processing apparatus of claim 1, wherein the first convolution operator comprises:
   a depth-wise convolution operator; and
   a point-wise convolution operator connected directly to the depth-wise convolution operator.

5. The image processing apparatus of claim 1, wherein the feature map processor comprises:
   a compressor configured to compress each feature map into at least one line unit.

6. The image processing apparatus of claim 5, wherein the feature map processor further comprises:
   at least one second line buffer configured to store each feature map compressed in the line unit.

7. The image processing apparatus of claim 6, wherein the feature map processor further comprises:
   a decompressor configured to reconstruct, to 2D feature maps, the feature maps compressed in the line units.

8. The image processing apparatus of claim 1, further comprising:
   a second convolution operator configured to perform convolution operation based on the feature map output in the 2D or higher dimensional form.

9. The image processing apparatus of claim 8, wherein the second convolution operator comprises:
   at least one 2D convolution operator configured to perform 2D convolution operation.

10. The image processing apparatus of claim 8, wherein the second convolution operator comprises:
    a depth-wise convolution operator; and
    a point-wise convolution operator connected directly to the depth-wise convolution operator.

11. The image processing apparatus of claim 1, further comprising:
   a quantizer configured to quantize a result of at least one convolution operation.

12. The image processing apparatus of claim 1, further comprising:
   at least one weight buffer configured to store parameter values used for convolution operation.

13. An image processing method comprising:
   receiving an image;
   outputting the image to be image lines of a line unit through at least one first line buffer;
   generating at least one feature map by performing a first convolution operation based on the output image lines; and
   storing the at least one feature map into at least one line unit, and processing the at least one generated feature map to output the at least one feature map stored in the line unit to be in a two- or higher-dimensional form.

14. The image processing method of claim 13, wherein the first convolution operation is performed in a residual block to learn residual signals and output the learned residual signals.

15. The image processing method of claim 13, wherein the generating comprises:
   performing at least one one-dimensional (1D) convolution operation.

16. The image processing method of claim 13, wherein the generating comprises:
   performing a depth-wise convolution operation; and
   performing a point-wise convolution operation directly on a result of the depth-wise convolution operation.

17. The image processing method of claim 13, wherein the processing comprises:
   compressing the at least one feature map into at least one line unit.

18. The image processing method of claim 17, wherein the processing further comprises:
   storing the at least one feature map compressed into the at least one line unit.

19. The image processing method of claim 18, wherein the processing further comprises:
   reconstructing, to a 2D feature map, the at least one feature map compressed into the at least one line unit.

20. The image processing method of claim 13, further comprising:
   performing a second convolution operation on the feature map output in the 2D or higher dimensional form.

21. The image processing method of claim 20, wherein the performing comprises:
   performing at least one 2D convolution operation.

22. The image processing method of claim 20, wherein the performing comprises:
   performing a depth-wise convolution operation; and
   performing a point-wise convolution operation directly on a result of the depth-wise convolution operation.

23. The image processing method of claim 13, further comprising:
   quantizing a result of at least one convolution operation.

24. The image processing method of claim 13, further comprising:
   storing at least one parameter value used for convolution operation.

* * * * *